(12) United States Patent
Kuwahara et al.

(10) Patent No.: US 9,594,564 B2
(45) Date of Patent: Mar. 14, 2017

(54) ARITHMETIC PROCESSING DEVICE AND CONTROL METHOD OF ARITHMETIC PROCESSING DEVICE

(71) Applicant: FUJITSU LIMITED, Kawasaki-shi, Kanagawa (JP)

(72) Inventors: Kotaro Kuwahara, Suginami (JP); Takashi Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 367 days.

(21) Appl. No.: 14/318,732

(22) Filed: Jun. 30, 2014

(65) Prior Publication Data

US 2015/0052338 A1 Feb. 19, 2015

(30) Foreign Application Priority Data

Aug. 13, 2013 (JP) .................. 2013-168214

(51) Int. Cl.
*G06F 9/38* (2006.01)

(52) U.S. Cl.
CPC .......... *G06F 9/3806* (2013.01); *G06F 9/3848* (2013.01)

(58) Field of Classification Search
CPC ..... G06F 9/3808; G06F 9/3806; G06F 9/3848
See application file for complete search history.

(56) References Cited

U.S. PATENT DOCUMENTS 5,687,360 A * 11/1997 Chang ............... G06F 9/3848
  712/240
6,938,151 B2 * 8/2005 Bonanno ........... G06F 9/3848
  712/239

(Continued)

FOREIGN PATENT DOCUMENTS

| JP | 06-059887   | 3/1994 |
| JP | 2001-014162 | 1/2001 |
| JP | 2006-99528 A| 4/2006 |

OTHER PUBLICATIONS

Japanese Office Action mailed Nov. 29, 2016 for corresponding Japanese Patent Application No. 2013-168214, with Partial English Translation, 7 pages.

*Primary Examiner* — Benjamin Geib
(74) *Attorney, Agent, or Firm* — Fujitsu Patent Center

(57) ABSTRACT

An arithmetic processing device includes: first prediction units which output branch prediction information of a fetched conditional branch instruction based on past branch history information of conditional branch instructions; a second prediction unit which stores a branch taken consecutive number of times and a branch not-taken consecutive number of times to a pattern information storage unit, and outputs branch prediction information of a fetched conditional branch instruction based on the past branch taken consecutive number of times or branch not-taken consecutive number of times stored; selecting units which selectively output the branch prediction information output from the first prediction units or the second prediction unit; and a selector which outputs a next instruction address of the conditional branch instruction or a branch target address of the conditional branch instruction to an instruction fetch unit in accordance with the branch prediction information output by the selecting units.

4 Claims, 13 Drawing Sheets

(56) References Cited

U.S. PATENT DOCUMENTS

| | | | |
|---|---|---|---|
| 7,266,676 B2* | 9/2007 | Tran | G06F 9/3804 |
| | | | 712/233 |
| 2006/0095748 A1 | 5/2006 | Yokoi | |
| 2007/0162728 A1 | 7/2007 | Yokoi | |

* cited by examiner

F I G. 1
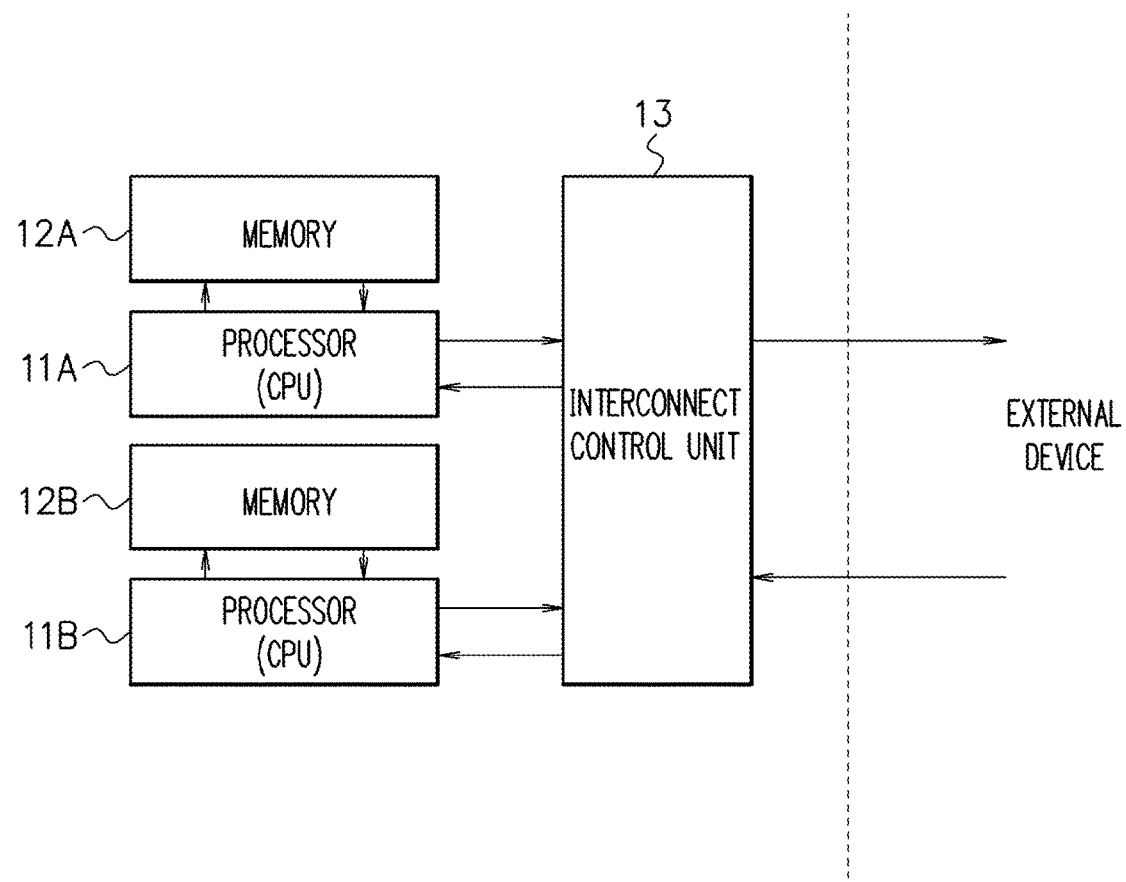

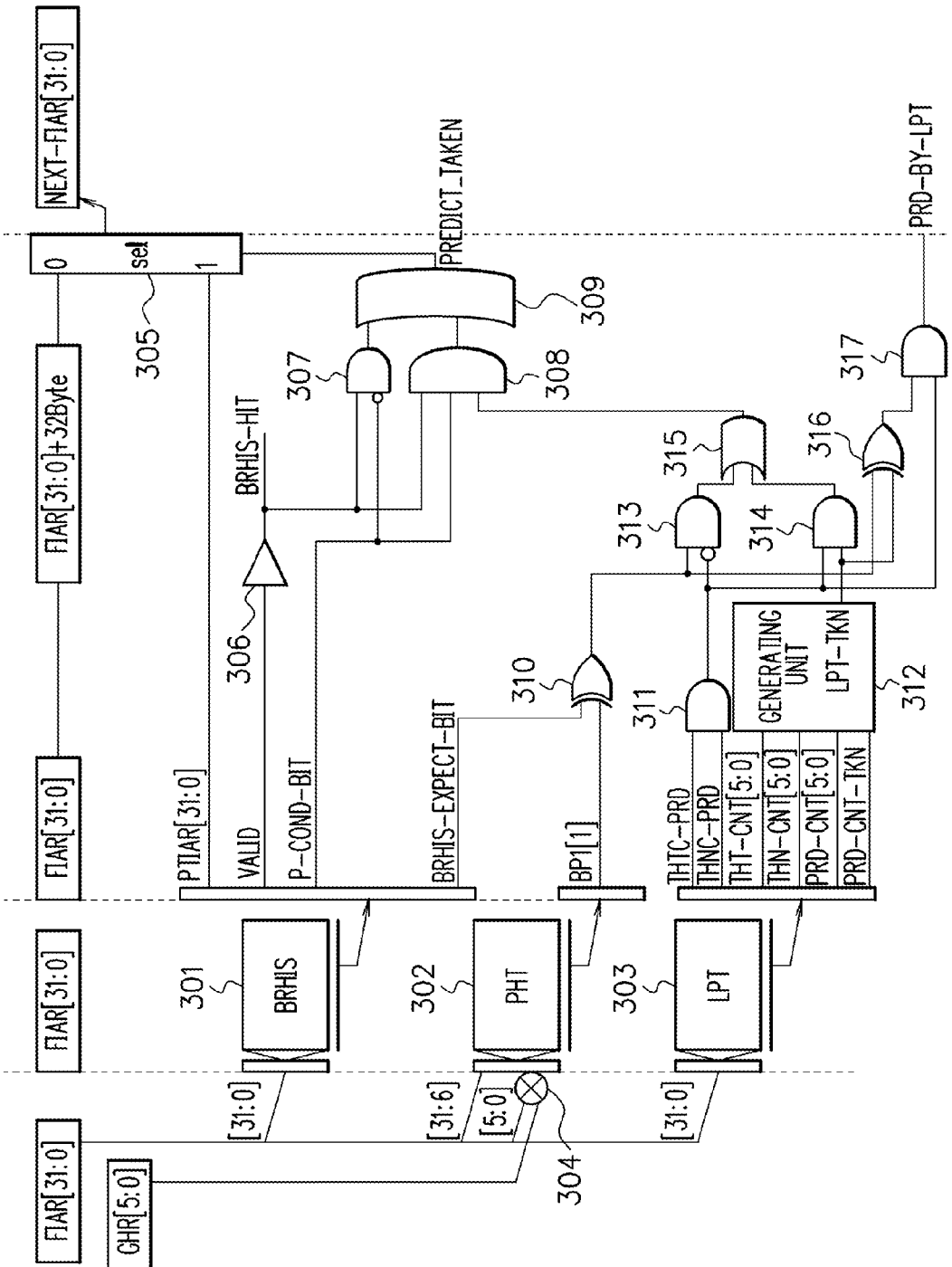
F I G. 3

F I G. 4A

| VALID | PTIAR[31:0] | P-COND-BIT | BRHIS-EXPECT-BIT |

F I G. 4B

| BP1[1:0] |

F I G. 4C

| LPT-VALID | LPT-DIZZY | |
|---|---|---|
| PRD-CNT[5:0] | PRD-CNT-TKN | |
| CMP-CNT[5:0] | CMP-CNT-TKN | |
| THT-CNT[5:0] | THTC-PRD | THTC-DEF |
| THN-CNT[5:0] | THNC-PRD | THNC-DEF |

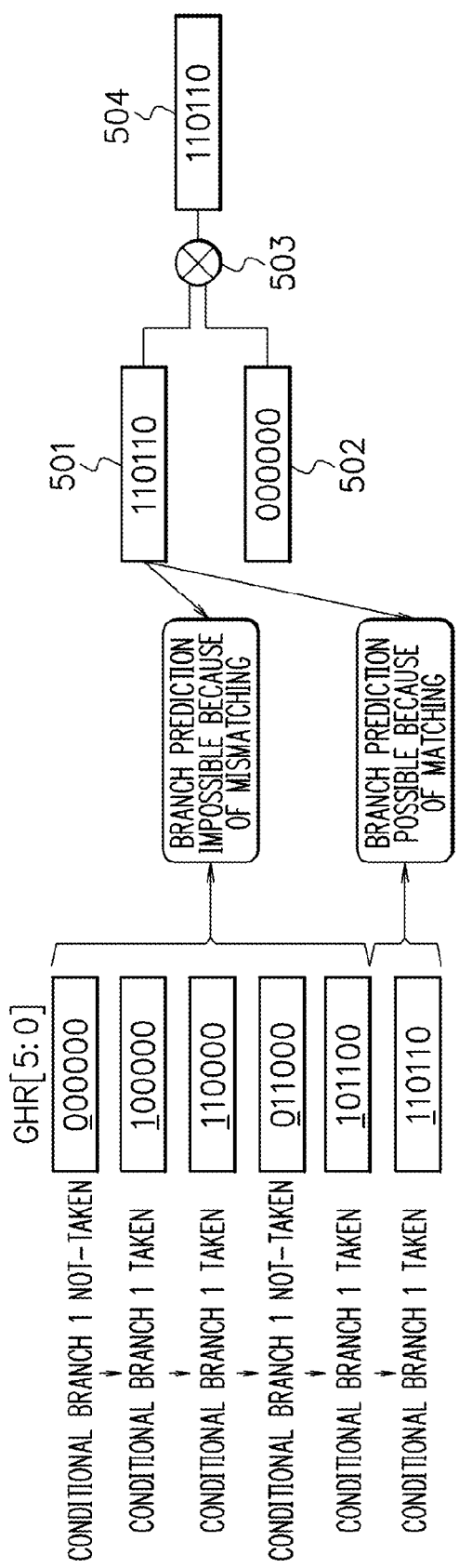

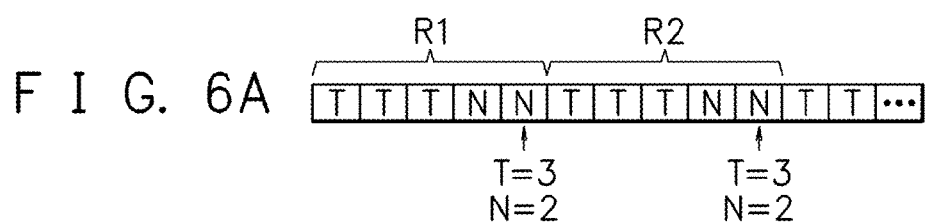
F I G. 6A
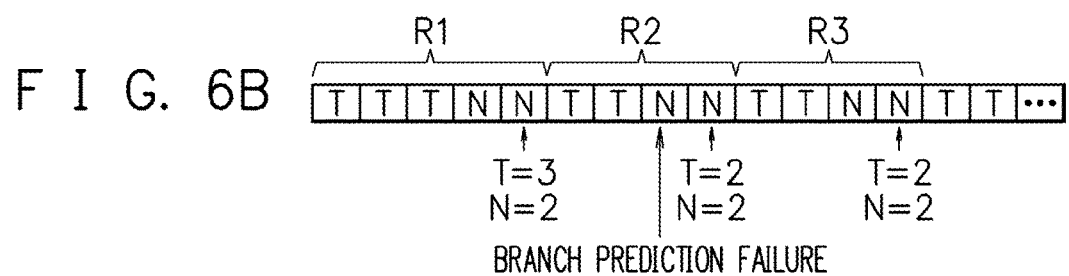
F I G. 6B

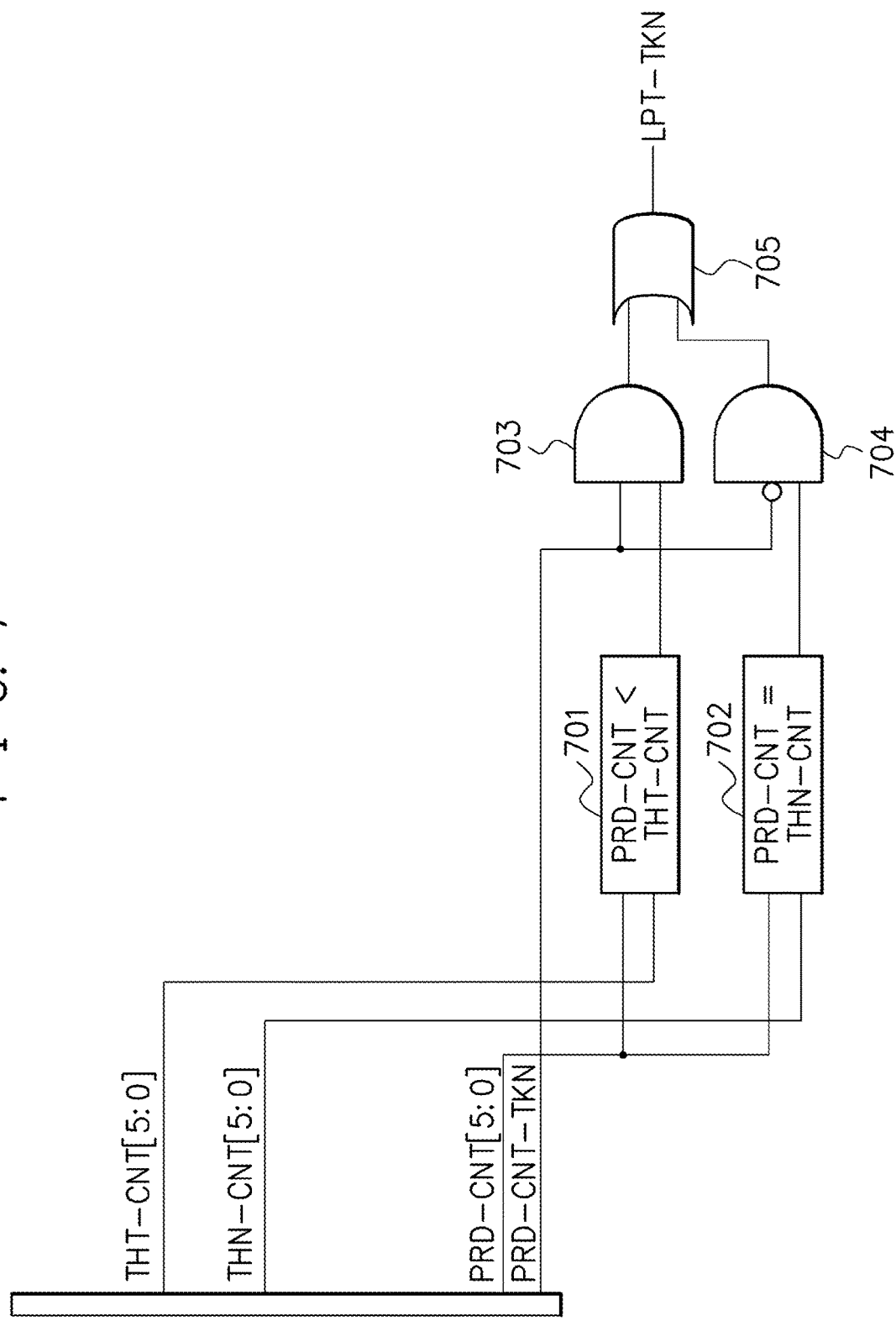

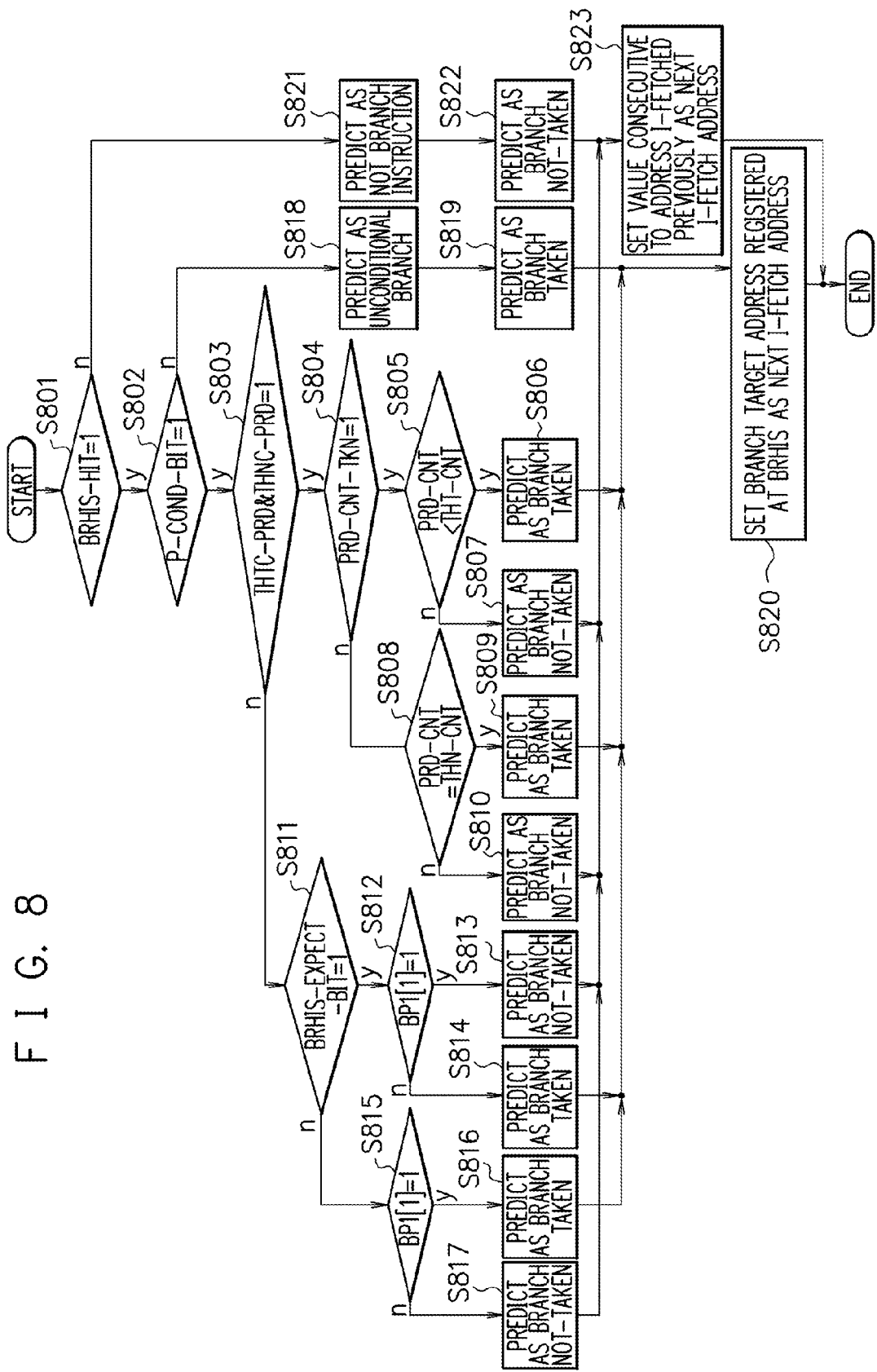

ARITHMETIC PROCESSING DEVICE AND CONTROL METHOD OF ARITHMETIC PROCESSING DEVICE

CROSS-REFERENCE TO RELATED APPLICATION

This application is based upon and claims the benefit of priority of the prior Japanese Patent Application No. 2013-168214, filed on Aug. 13, 2013, the entire contents of which are incorporated herein by reference.

FIELD

The embodiments discussed herein are directed to an arithmetic processing device and a control method of the arithmetic processing device.

BACKGROUND

A processor executing a pipeline control method includes a branch prediction mechanism being a mechanism predicting a branch to effectively perform an instruction fetch from a memory to an instruction execution unit. In a processor executing an out of order control, there is a case when the instruction fetch is performed prior to an instruction execution, and therefore, importance of the branch prediction mechanism is high.

A branch prediction method storing a record whether or not a conditional branch is performed for each conditional branch instruction executed by a processor is known (for example, refer to Patent Document 1). In this record, plural occurrences of each conditional branch are included in each memory address, and it is predicted whether or not a branch occurs based on the record and a prediction pattern when a conditional branch instruction is executed, and an instruction in an instruction stream is fetched in response to the prediction.

Besides, a branch prediction method predicting whether or not a branch occurs based on a latest actual performance of the conditional branch in the past or yes/no of whether or not the branch predictions for several times in the past hit when the conditional branch instruction is executed, is known (for example, refer to Patent Document 2).

[Patent Document 1] Japanese Laid-open Patent Publication No. H6-59887
[Patent Document 2] Japanese Laid-open Patent Publication No. 2001-14162

When the branch prediction of the conditional branch instruction is performed, it is necessary to record branch results of the past conditional branches, and to record branch prediction information by each conditional branch history pattern in the past. However, there are a lot of kinds in the conditional branch history patterns in the past, and therefore, it takes considerable time to record the branch prediction information by each conditional branch history pattern in the past. There is a problem in which it is difficult to enable a precise branch prediction and an accuracy of the branch prediction becomes low until the above-stated branch prediction information is recorded.

SUMMARY

An arithmetic processing device includes: a branch history storage unit configured to store past branch history information of conditional branch instructions; first prediction units configured to output branch prediction information of a fetched conditional branch instruction based on the branch history information stored by the branch history storage unit; a second prediction unit configured to store a branch taken consecutive number of times being the number of times in which branches of the conditional branch instructions are consecutively taken and a branch not-taken consecutive number of times being the number of times in which the branches of the conditional branch instructions are consecutively not taken to a pattern information storage unit, and output branch prediction information of the fetched conditional branch instruction based on the past branch taken consecutive number of times or branch not-taken consecutive number of times stored at the pattern information storage unit; selecting units configured to selectively output the branch prediction information output from the first prediction units or the branch prediction information output from the second prediction unit; and a selector configured to output a next instruction address of the conditional branch instruction or a branch target address of the conditional branch instruction to an instruction fetch unit in accordance with the branch prediction information output from the selecting units.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a view illustrating a configuration example of an information processing system including a processor as an arithmetic processing device according to the embodiment;

FIG. 3 is a view illustrating a configuration example of a branch prediction unit in FIG. 2;

FIGS. 4A to 4C are views each illustrating a configuration example of a table;

FIG. 5 is a view to explain a pattern history table in FIG. 3;

FIGS. 6A and 6B are views to explain an example of a local pattern table;

FIG. 7 is a view illustrating a configuration example of a generating unit in FIG. 3;

FIG. 8 is a flowchart illustrating a control method of the arithmetic processing device;

DESCRIPTION OF EMBODIMENTS

FIG. 1 is a view illustrating a configuration example of an information processing system including a processor as an arithmetic processing device according to the present embodiment. The information processing system illustrated in FIG. 1 includes, for example, plural processors 11A, 11B and memories 12A, 12B, and an interconnect control unit 13 performing an input/output control with external devices.

Figure 2:
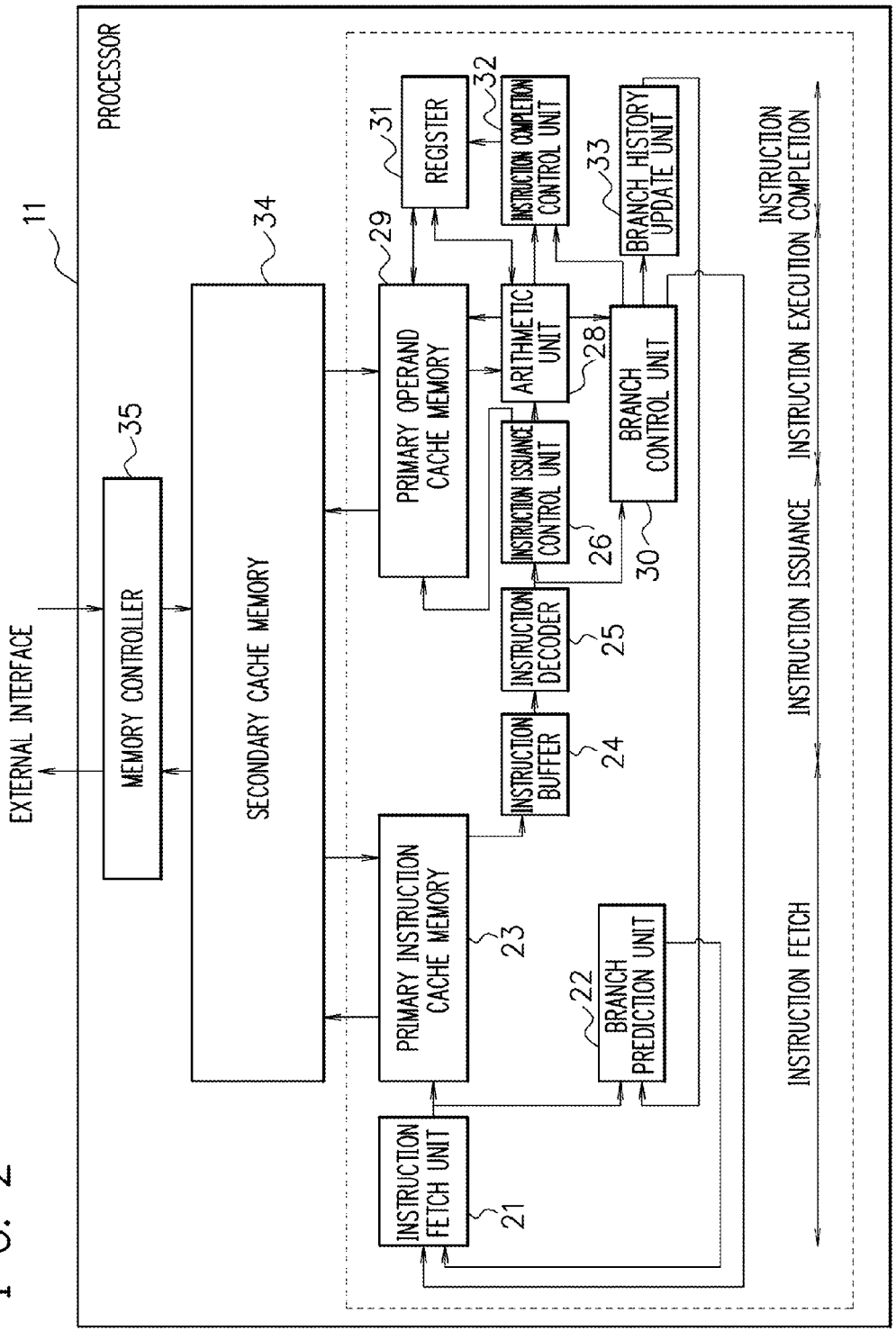
FIG. 2 is a view illustrating a configuration example of the processor.

FIG. 2 is a view illustrating a configuration example of a processor 11. The processor 11 is an arithmetic processing device, corresponds to the processors 11A, 11B in FIG. 1, and includes functions of, for example, an out of order execution and a pipeline process of an instruction.

At an instruction fetch stage, an instruction fetch unit 21, an instruction buffer 24, a branch prediction unit 22, a primary instruction cache memory 23, a secondary cache memory 34, and so on operate. The instruction fetch unit 21 receives a prediction branch target address of an instruction fetched from the branch prediction unit 22, a branch target address determined by a branch operation from a branch control unit 30, and so on. The instruction fetch unit 21 selects one address from among the received prediction branch target address, the branch target address, and a continuous next address to an instruction created in the instruction fetch unit 21 and which is to be fetched when a branch does not occur, and so on, and determines a next instruction fetch address. The instruction fetch unit 21 outputs the determined instruction fetch address to the primary instruction cache memory 23, and fetches an instruction code corresponding to the output and determined instruction fetch address.

The primary instruction cache memory 23 stores a part of data of the secondary cache memory 34, and the secondary cache memory 34 stores a part of data of memories which are accessible via a memory controller 35. When a data of a corresponding address does not exist in the primary instruction cache memory 23, the data is fetched from the secondary cache memory 34, and when the corresponding data does not exist in the secondary cache memory 34, the data is fetched from the memory. In the present embodiment, the memory is disposed at outside of the processor 11, and therefore, an input/output control with the external memory is performed via the memory controller 35. The instruction code fetched from the primary instruction cache memory 23, the secondary cache memory 34, or the corresponding address of the memory is stored at the instruction buffer 24.

The branch prediction unit 22 receives the instruction fetch address output from the instruction fetch unit 21, and executes a branch prediction in parallel to the instruction fetch. The branch prediction unit 22 performs the branch prediction based on the received instruction fetch address, and returns a branch direction indicating taken or not-taken of the branch and the prediction branch target address to the instruction fetch unit 21. The instruction fetch unit 21 selects the predicted branch target address as the next instruction fetch address when the predicted branch direction is taken.

At an instruction issuance stage, an instruction decoder 25 and an instruction issuance control unit 26 operate. The instruction decoder 25 receives the instruction code from the instruction buffer 24, analyses a type, required execution resources, and so on of the instruction, and outputs the analysis result to the instruction issuance control unit 26. The instruction issuance control unit 26 has a structure of a reservation station. The instruction issuance control unit 26 examines a dependency relationship of a register and so on referred to by the instruction, and judges whether or not the execution resources are able to execute the instruction from an update state of the register having the dependency relationship, an execution state of an instruction using the same execution resources, and so on. When the instruction issuance control unit 26 judges that the execution resources are able to execute the instruction, the instruction issuance control unit 26 outputs information such as a register number, an operand address which is necessary for the execution of the instruction to the execution resources such as an arithmetic unit 28, a primary operand cache memory 29. Besides, the instruction issuance control unit 26 also includes a function as a buffer storing the instruction until it is in an executable state.

At an instruction execution stage, the execution resources such as the arithmetic unit 28, the primary operand cache memory 29, and the branch control unit 30 operate. The arithmetic unit 28 receives data from a register 31 and the primary operand cache memory 29, executes arithmetic operations corresponding to instructions such as four arithmetic operations, a logical operation, a trigonometric function operation, an address calculation, and outputs the arithmetic results to the register 31 and the primary operand cache memory 29. The primary operand cache memory 29 stores a part of data of the secondary cache memory 34 as same as the primary instruction cache memory 23. The primary operand cache memory 29 is used for a load of data from the memory to the arithmetic unit 28 and the register 31 by a load instruction, a store of data from the arithmetic unit 28 and the register 31 to the memory by a store instruction, and so on. Each execution resource outputs a completion notice of the instruction execution to an instruction completion control unit 32.

The branch control unit 30 receives the type of the branch instruction from the instruction decoder 25, receives the branch target address and a result of the arithmetic operation to be a branch condition from the arithmetic unit 28, and judges that the branch is taken when the arithmetic result satisfies the branch condition and the branch is not taken when the arithmetic result does not satisfy the branch condition, and determines the branch direction. Besides, the branch control unit 30 performs a judgment whether or not the arithmetic result, the branch target address at the branch prediction time, and the branch direction match, and also performs a control of an order relation of the branch instructions. The branch control unit 30 outputs a completion notice of the branch instruction to the instruction completion control unit 32 when the arithmetic result and the prediction match. On the other hand, when the arithmetic result and the prediction do not match, it means a failure of the branch prediction, and therefore, the branch control unit 30 outputs a cancellation of a succeeding instruction and a re-instruction fetch request together with the completion notice of the branch instruction to the instruction completion control unit 32.

At an instruction completion stage, the instruction completion control unit 32, the register 31, and a branch history update unit 33 operate. The instruction completion control unit 32 performs an instruction completion process in an instruction code sequence stored at a commit stack entry based on the completion notice received from each execution resource of the instruction, and outputs an update indication of the register 31. The register 31 executes the update of the register based on the data of the arithmetic results received from the arithmetic unit 28 and the primary operand cache memory 29 when the resister update indication is received from the instruction completion control unit 32. The branch history update unit 33 creates a history update data of the branch prediction based on the result of the branch operation received from the branch control unit 30, and outputs to the branch prediction unit 22.

FIG. 3 is a view illustrating a configuration example of the branch prediction unit 22 in FIG. 2. The branch prediction unit 22 inputs values of an instruction fetch address (Fetched Instruction AddRess) FIAR[31:0] and a global history register (Global History Register) GHR[5:0], and outputs a next instruction fetch address NEXT-FIAR[31:0] to the instruction fetch unit 21 in FIG. 2. The instruction fetch address FIAR[31:0] is a 32-bit address of an instruction which is input from the instruction fetch unit 21 in FIG. 2, and is instruction fetched. A global history register GHR[5:0] is a 6-bit register which is input from the branch history update unit 33 in FIG. 2 and stores the branch history of, for example, previous six conditional branch instructions.

A branch history table (BRHIS: BRanch HIStory table) 301 stores a valid flag VALID, a 32-bit branch target address (Predicted Target Instruction AddRess) PTIAR[31:0], a conditional branch instruction bit P-COND-BIT, and a condition taken expected value BRHIS-EXPECT-BIT by each instruction fetch address FIAR[31:0] as illustrated in FIG. 4A. The branch history table (branch history storage unit) 301 outputs the valid flag VALID, the branch target address PTIAR[31:0], the conditional branch instruction bit P-COND-BIT, and the condition taken expected value BRHIS-EXPECT-BIT corresponding to the instruction fetch address FIAR[31:0] when the instruction fetch address FIAR[31:0] is input in parallel to the instruction fetch.

The valid flag VALID indicates that the instruction of the instruction fetch address FIAR[31:0] is not the branch instruction when it is "0" (zero), and indicates that the instruction of the instruction fetch address FIAR[31:0] is the branch instruction when it is "1". The branch target address PTIAR[31:0] is a branch target address of the branch instruction of the instruction fetch address FIAR[31:0]. The conditional branch instruction bit P-COND-BIT indicates that the instruction of the instruction fetch address FIAR [31:0] is not the conditional branch instruction when it is "0" (zero), and indicates that the instruction of the instruction fetch address FIAR[31:0] is the conditional branch instruction when it is "1". The condition taken expect value BRHIS-EXPECT-BIT indicates that a branch expected value of the conditional branch instruction of the instruction fetch address FIAR[31:0] is not-taken when it is "0" (zero), and indicates that the branch expected value of the conditional branch instruction of the instruction fetch address FIAR[31:0] is taken when it is "1". The conditional branch instruction transits to an instruction of the branch target address PTIAR[31:0] at a next time when the condition is taken, and transits to an instruction of a next address at the next time when the condition is not taken.

A buffer 306 performs buffering of the valid flag VALID, and outputs a branch history table hit bit BRHIS-HIT. A logical product (AND) circuit 307 outputs a logical product between the branch history table hit bit BRHIS-HIT and a logically inverted bit of the conditional branch instruction bit P-COND-BIT. A logical product circuit 308 outputs a logical product among the branch history table hit bit BRHIS-HIT, the conditional branch instruction bit P-COND-BIT, and an output value of a logical sum (OR) circuit 315. A logical sum circuit 309 outputs a logical sum between the output value of the logical product circuit 307 and the output value of the logical product circuit 308 as branch prediction information PREDICT-TAKEN. The branch prediction information PREDICT-TAKEN indicates the prediction of the branch not taken when it is "0" (zero), and indicates the prediction of the branch taken when it is "1". A selector 305 selects and outputs an address in which 32 bytes are added to the instruction fetch address FIAR [31:0] as a next instruction fetch address NEXT-FIAR[31:0] when the branch prediction information PREDICT-TAKEN is "0" (zero), and selects and outputs the branch target address PTIAR[31:0] as the next instruction fetch address NEXT-FIAR[31:0] when the branch prediction information PREDICT-TAKEN is "1". Here, a unit of data fetched at one time is 32 bytes.

When the valid flag VALID is "0" (zero), it is indicated that the instruction to be fetched is not the branch instruction, and therefore, the branch prediction information PREDICT-TAKEN becomes "0" (zero), and the branch not-taken is predicted. When the valid flag VALID is "1", it is indicated that the instruction to be fetched is the branch instruction, and when the conditional branch instruction bit P-COND-BIT is "0" (zero), it is indicated that the instruction to be fetched is an unconditional branch instruction, and therefore, the branch prediction information PREDICT-TAKEN becomes "1", and it is predicted that the branch is taken. Besides, when the valid flag VALID is "1" and the conditional branch instruction bit P-COND-BIT is "1", it is indicated that the instruction to be fetched is the conditional branch instruction, and therefore, the output value of the logical sum circuit 315 becomes the branch prediction information PREDICT-TAKEN.

Next, a pattern history table (PHT: Pattern History Table) 302 is described. An exclusive logical sum circuit 304 outputs an exclusive logical sum between an instruction fetch address FIAR[5:0] and a value of the global history register GHR[5:0]. The instruction fetch address FIAR[5:0] is an address of lower 6 bits from among the instruction fetch address FIAR[31:0]. The pattern history table 302 stores a 2-bit branch taken accuracy information BP1[1:0] by each instruction fetch address FIAR[31:6] and each output value of the exclusive logical sum circuit 304 as illustrated in FIG. 4B. The instruction fetch address FIAR [31:6] is an address of upper 26 bits from among the instruction fetch address FIAR[31:0]. The branch taken accuracy information BP1[1:0] is decremented by the branch history update unit 33 in FIG. 2 when the branch result is the same as the condition taken expected value BRHIS-EXPECT-BIT, and is incremented when the branch result is different from the condition taken expected value BRHIS-EXPECT-BIT. Note that the branch taken accuracy information BP1[1:0] is a value from "0" (zero) to "3", and maintains to be "0" (zero) even if it is decremented under the to be "0" (zero) state, and maintains to be "3" even if it is incremented under the "3" state. As the value of the branch taken accuracy information BP1[1:0] is smaller, it means that the accuracy of the condition taken expected value BRHIS-EXPECT-BIT is high.

FIG. 5 is a view to explain the pattern history table 302 in FIG. 3. In the global history register GHR[5:0], for example, an initial value is "000000", "1" indicates the condition taken, and "0" (zero) indicates the condition not-taken. The branch history update unit 33 shifts the global history register GHR[5:0] one bit to the right, and sets a left first bit to "0" (zero) when a conditional branch instruction 1 is the condition not-taken, and therefore, the global history register GHR[5:0] becomes "000000". Next, the branch history update unit 33 shifts the global history register GHR[5:0] one bit to the right, and sets the left first bit to "1" when the conditional branch instruction 1 is the condition taken, and therefore, the global history register GHR[5:0] becomes "100000". Next, the branch history update unit 33 shifts the global history register GHR[5:0] one bit to the right, and sets the left first bit to "1" when the conditional branch instruction 1 is the condition taken, and therefore, the global history register GHR[5:0] becomes "110000". Next, the branch history update unit 33 shifts the global history register GHR[5:0] one bit to the right, and sets the left first bit to "0" (zero) when the conditional branch instruction 1 is the condition not-taken, and therefore, the global history register GHR[5:0] becomes "011000". Next, the branch history update unit 33 shifts the global history register GHR[5:0] one bit to the right, and sets the left first bit to "1" when the conditional branch instruction 1 is the condition taken, and therefore, the global history register GHR[5:0] becomes "101100". Next, the branch history update unit 33 shifts the global history register GHR[5:0] one bit to the right, and sets the left first bit to "1" when the conditional branch instruction 1 is the condition taken, and therefore, the global history register GHR[5:0] becomes "110110". The branch taken accuracy information BP1[1:0] corresponding to these global history registers GHR [5:0] is recorded to the pattern history table 302.

Here, when a value 501 of the global history register GHR[5:0] being "110110" is input, it is impossible to perform the branch prediction by the pattern history table 302 during a period when the global history register GHR [5:0] is the values from "000000" to "101100" because it is mismatched with the value 501 of the global history register GHR[5:0] being "110110". After that, when the branch taken accuracy information BP1[1:0] of the global history register GHR[5:0] being "110110" is recorded at the pattern history table 302, it matches with the value 501 of the global history register GHR[5:0] being "110110", and therefore, it becomes possible to perform the branch prediction by the pattern history table 302.

When the branch prediction of the conditional branch instruction is performed, it is necessary to record the branch taken accuracy information BP1[1:0] corresponding to the history pattern of the global history register GHR[5:0], and to record the branch taken accuracy information BP1[1:0] by each history pattern of the global history register GHR[5:0]. However, there are many kinds in the history patterns of the global history register GHR[5:0], and therefore, a lot of time is required to record the branch taken accuracy information BP1[1:0] by each history pattern of the global history register GHR[5:0]. It is difficult to perform the accurate branch prediction until they are recorded, and the accuracy of the branch prediction is lowered. Accordingly, in the present embodiment, the branch prediction is performed by using a later-described local pattern table (LPT) 303 until they are recorded to thereby improve the accuracy of the branch prediction.

An exclusive logical sum circuit 503 corresponds to the exclusive logical sum circuit 304 in FIG. 3, and outputs an exclusive logical sum between the value 501 of the global history register GHR[5:0] and a value 502 of the instruction fetch address FIAR[5:0] as an index 504. The pattern history table 302 inputs the instruction fetch address FIAR[31:6] and the index 504, then outputs branch taken accuracy information BP1[1] corresponding thereto. The branch taken accuracy information BP1[1] is information of upper 1-bit from among the branch taken accuracy information BP1[1:0] in 2-bit. When the branch taken accuracy information BP1[1] is "0" (zero), it indicates that the accuracy of the condition taken expected value BRHIS-EXPECT-BIT is high, and when the branch taken accuracy information BP1[1] is "1", it indicates that the accuracy of the condition taken expected value BRHIS-EXPECT-BIT is low.

An exclusive logical sum circuit 310 outputs an exclusive logical sum between the condition taken expected value BRHIS-EXPECT-BIT and the branch taken accuracy information BP1[1]. When the condition taken expected value BRHIS-EXPECT-BIT is "1" (taken), the exclusive logical sum circuit 310 outputs "1" (taken) when the branch taken accuracy information BP1[1] is "0" (zero), and outputs "0" (zero) (not-taken) when the branch taken accuracy information BP1[1] is "1". Besides, when the condition taken expected value BRHIS-EXPECT-BIT is "0" (zero) (not-taken), the exclusive logical sum circuit 310 outputs "0" (zero) (not-taken) when the branch taken accuracy information BP1[1] is "0" (zero), and outputs "1" (taken) when the branch taken accuracy information BP1[1] is "1".

The local pattern table (pattern information storage unit) 303 stores a valid flag LPT-VALID, a prediction mistaken bit LPT-DIZZY, a current prediction consecutive number of times PRD-CNT[5:0], a current prediction condition taken bit PRD-CNT-TKN, a current completion consecutive number of times CMP-CNT[5:0], a current completion condition taken bit CMP-CNT-TKN, a one cycle condition taken consecutive number of times THT-CNT[5:0], a condition taken consecutive number of times accuracy bit THTC-PRD, a condition taken change bit THTC-DEF, a one cycle condition not-taken consecutive number of times THN-CNT [5:0], a condition not-taken consecutive number of times accuracy bit THNC-PRD, a condition not-taken change bit THNC-DEF by each instruction fetch address FIAR[31:0] as illustrated in FIG. 4C.

FIG. 6A is a view to explain an example of the local pattern table 303. Here, "T" indicates the condition taken of the conditional branch instruction, and "N" indicates the condition not-taken of the conditional branch instruction. The conditional branch instruction becomes the condition taken or not-taken in, for example, a first cycle R1 and a second cycle R2. In the first cycle R1, the condition taken T continues for three times, and thereafter, the condition not-taken N continues for two times. In the second cycle R2, the condition taken T continues for three times, and thereafter, the condition not-taken N continues for two times. The first cycle R1 and the second cycle R2 are the same, and therefore, it can be predicted that the conditional branch instruction becomes the condition taken or not-taken in, for example, the first cycle R1 and the second cycle R2. Namely, it can be predicted that the condition taken T continues for three times and thereafter, the condition not-taken N continues for two times.

In this case, the one cycle condition taken consecutive number of times THT-CNT[5:0] becomes "3". The one cycle condition not-taken consecutive number of times THN-CNT [5:0] becomes "2". A condition taken consecutive number of times accuracy bit THTC-PRD indicates the accuracy of the one cycle condition taken consecutive number of times THT-CNT[5:0], and it becomes "1" when "3" being the consecutive number of times of the condition taken T in the first cycle R1 and "3" being the consecutive number of times of the condition taken T in the second cycle R2 are the same. The condition not-taken consecutive number of times accuracy bit THNC-PRD indicates the accuracy of the one cycle condition not-taken consecutive number of times THN-CNT [5:0], and it becomes "1" when "2" being the consecutive number of times of the condition not-taken N in the first cycle R1 and "2" being the consecutive number of times of the condition not-taken N in the second cycle R2 are the same. The condition taken change bit THTC-DEF becomes "1" when the condition taken T changes into the condition not-taken N. The condition not-taken change bit THNC-DEF becomes "1" when the condition not-taken N changes into the condition taken T.

When the valid flag LPT-VALID is "1", it indicates that the local pattern table 303 is valid, and when it is "0" (zero), it indicates that the local pattern table 303 is invalid. The prediction mistaken bit LPT-DIZZY becomes "1" when the branch prediction by the local pattern table 303 performed at the last time fails.

The current prediction consecutive number of times PRD-CNT[5:0] indicates the consecutive number of times of the condition taken T or the condition not-taken N of the current branch prediction. When the current prediction condition taken bit PRD-CNT-TKN is "1", it indicates that the current branch prediction is the condition taken T, and when it is "0" (zero), it indicates that the current branch prediction is the condition not-taken N. For example, at a second branch prediction in the first cycle R1, the current prediction condition taken bit PRD-CNT-TKN is "1" and the current prediction consecutive number of times PRD-CNT[5:0] is "2". In this case, it is possible to predict that the next branch prediction is the condition taken T. Besides, at a fourth branch prediction in the first cycle R1, the current prediction condition taken bit PRD-CNT-TKN is "0" (zero) and the current prediction consecutive number of times PRD-CNT[5:0] is "1". In this case, it is possible to predict that the next branch prediction is the condition not-taken N.

The current completion consecutive number of times CMP-CNT[5:0] indicates the consecutive number of times of the condition taken T or the condition not-taken N after the branch instruction completion by the current branch history update unit 33. When the current completion condition taken bit CMP-CNT-TKN is "1", it indicates the condition taken T after the branch instruction completion by the current branch history update unit 33, and when it is "0" (zero), it indicates the condition not-taken N after the branch instruction completion by the current branch history update unit 33. For example, at the second branch instruction completion in the first cycle R1, the current completion condition taken bit CMP-CNT-TKN is "1", and the current completion consecutive number of times CMP-CNT[5:0] is "2". Besides, at the fourth branch instruction completion in the first cycle R1, the current completion condition taken bit CMP-CNT-TKN is "0" (zero), and the current completion consecutive number of times CMP-CNT[5:0] is "1".

FIG. 6B is a view to explain another example of the local pattern table 303. The conditional branch instruction includes, for example, the first cycle R1, the second cycle R2, and a third cycle R3. In the first cycle R1, the condition taken T continues for three times, and thereafter, the condition not-taken N continues for two times. On the other hand, in the second cycle R2, the condition taken T continues for two times, and thereafter, the condition not-taken N continues for two times. The first cycle R1 and the second cycle R2 are different, and therefore, the branch prediction is not performed because the branch prediction fails. After that, in the third cycle R3, the condition taken T continues for two times, and thereafter, the condition not-taken N continues for two times. The second cycle R2 and the third cycle R3 are the same, and therefore, it can be predicted that the conditional branch instruction becomes the condition taken or the condition not-taken in the second cycle R2 and the third cycle R3 after that. Namely, it is possible to predict that the condition taken T continues for two times, and thereafter, the condition not-taken N continues for two times.

The local pattern table 303 outputs the condition taken consecutive number of times accuracy bit THTC-PRD, the condition not-taken consecutive number of times accuracy bit THNC-PRD, the one cycle condition taken consecutive number of times THT-CNT[5:0], the one cycle condition not-taken consecutive number of times THN-CNT[5:0], the current prediction consecutive number of times PRD-CNT[5:0] and the current prediction condition taken bit PRD-CNT-TKN corresponding to the instruction fetch address FIAR[31:0] when it is input in parallel to the instruction fetch.

A logical product circuit 311 outputs a logical product between the condition taken consecutive number of times accuracy bit THTC-PRD and the condition not-taken consecutive number of times accuracy bit THNC-PRD. When both the condition taken consecutive number of times accuracy bit THTC-PRD and the condition not-taken consecutive number of times accuracy bit THNC-PRD are "1", it means that cycles of the consecutive number of times of the condition taken T and the consecutive number of times of the condition not-taken N appear two cycles or more in the past, and therefore, the logical product circuit 311 outputs "1", and the branch prediction by the local pattern table 303 is given priority over the branch prediction by the pattern history table 302.

A logical product circuit 313 outputs a logical product between the output value of the exclusive logical sum circuit 310 and a logically inverted value of the output value of the logical product circuit 311. When the output value of the logical product circuit 311 is "1", the logical product circuit 313 outputs "0" (zero) to disable the branch prediction by the pattern history table 302. When the output value of the logical product circuit 311 is "0" (zero), the output value of the logical product circuit 313 becomes the same as the output value of the exclusive logical sum circuit 310 to enable the branch prediction by the pattern history table 302.

A generating unit 312 inputs the one cycle condition taken consecutive number of times THT-CNT[5:0], the one cycle condition not-taken consecutive number of times THN-CNT[5:0], the current prediction consecutive number of times PRD-CNT[5:0], and the current prediction condition taken bit PRD-CNT-TKN, and outputs branch prediction information LPT-TKN.

FIG. 7 is a view illustrating a configuration example of the generating unit 312 in FIG. 3. A comparator 701 outputs "1" when the current prediction consecutive number of times PRD-CNT[5:0] is smaller than the one cycle condition taken consecutive number of times THT-CNT[5:0], and outputs "0" (zero) when the current prediction consecutive number of times PRD-CNT[5:0] is the one cycle condition taken consecutive number of times THT-CNT[5:0] or more. A comparator 702 outputs "1" when the current prediction consecutive number of times PRD-CNT[5:0] is the same as the one cycle condition not-taken consecutive number of times THN-CNT[5:0], and outputs "0" (zero) when the current prediction consecutive number of times PRD-CNT[5:0] is not the same as the one cycle condition not-taken consecutive number of times THN-CNT[5:0]. A logical product circuit 703 outputs a logical product between the current prediction condition taken bit PRD-CNT-TKN and the output value of the comparator 701. A logical product circuit 704 outputs a logical product between a logically inverted value of the current prediction condition taken bit PRD-CNT-TKN and the output value of the comparator 702. A logical sum circuit 705 outputs a logical sum between the output value of the logical product circuit 703 and the output value of the logical product circuit 704 as the branch prediction information LPT-TKN. As stated above, the generating unit 312 is able to output the branch prediction information LPT-TKN of the next conditional branch instruction based on the one cycle condition taken consecutive number of times THT-CNT[5:0], the one-cycle condition not-taken consecutive number of times THN-CNT[5:0], the current prediction consecutive number of times PRD- CNT[5:0], and the current prediction condition taken bit PRD-CNT-TKN. The branch prediction information LPT-TKN indicates the condition not-taken when it is "0" (zero), and indicates the condition taken when it is "1".

For example, when the current prediction condition taken bit PRD-CNT-TKN is "1", and the current prediction consecutive number of times PRD-CNT[5:0] is smaller than the one cycle condition taken consecutive number of times THT-CNT[5:0], the branch prediction information LPT-TKN becomes "1" because it is predicted that the next branch direction is the condition taken T. In this case, the current prediction consecutive number of times PRD-CNT[5:0] is incremented.

Besides, when the current prediction condition taken bit PRD-CNT-TKN is "1", and the current prediction consecutive number of times PRD-CNT[5:0] is the same as the one cycle condition taken consecutive number of times THT-CNT[5:0], the branch prediction information LPT-TKN becomes "0" (zero) because the branch direction is switched to the condition not-taken N, and it is predicted to be the condition not-taken N. In this case, the current prediction consecutive number of times PRD-CNT[5:0] is initialized to "1", and the current prediction condition taken bit PRD-CNT-TKN is set to "1".

Besides, when the current prediction condition taken bit PRD-CNT-TKN is "0" (zero), and the current prediction consecutive number of times PRD-CNT[5:0] is smaller than the one cycle condition not-taken consecutive number of times THN-CNT[5:0], the branch prediction information LPT-TKN becomes "0" (zero) because it is predicted that the next branch direction is the condition not-taken N. In this case, the current prediction consecutive number of times PRD-CNT[5:0] is incremented.

Besides, when the current prediction condition taken bit PRD-CNT-TKN is "0" (zero), and the current prediction consecutive number of times PRD-CNT[5:0] is the same as the one cycle condition not-taken consecutive number of times THN-CNT[5:0], the branch prediction information LPT-TKN becomes "1" because the branch direction is switched to the condition taken T, and it is predicted to be the condition taken T. In this case, the current prediction consecutive number of times PRD-CNT[5:0] is initialized to "1", and the current prediction condition taken bit PRD-CNT-TKN is set to "1".

A logical product circuit 314 in FIG. 3 outputs a logical product between the output value of the logical product circuit 311 and the branch prediction information LPT-TKN. When the output value of the logical product circuit 311 is "0" (zero), the logical product circuit 314 outputs "0" (zero) to disable the branch prediction by the local pattern table 303. When the output value of the logical product circuit 311 is "1", the output value of the logical product circuit 314 becomes the same as the branch prediction information LPT-TKN to enable the branch prediction by the local pattern table 303. The logical sum circuit 315 outputs a logical sum between the output value of the logical product circuit 313 and the output value of the logical product circuit 314. When the output value of the logical product circuit 311 is "1", the logical sum circuit 315 outputs the branch prediction information LPT-TKN by the local pattern table 303. Besides, when the output value of the logical product circuit 311 is "0" (zero), the logical sum circuit 315 outputs the output value of the exclusive logical sum circuit 310 (the branch prediction information by the pattern history table 302). Namely, when the output value of the logical product circuit 311 is "1", the branch prediction information by the local pattern table 303 is selected, and when the output value of the logical product circuit 311 is "0" (zero), the branch prediction information by the pattern history table 302 is selected.

When the instruction of the instruction fetch address FIAR[31:0] is the conditional branch instruction, the branch prediction information PREDICT-TAKEN becomes the same value as the output value of the logical sum circuit 315. The selector 305 selects the next instruction fetch address NEXT-FIAR[31:0] in accordance with the branch prediction information PREDICT-TAKEN as stated above.

An exclusive logical sum circuit 316 outputs an exclusive logical sum between the output value of the exclusive logical sum circuit 310 and the branch prediction information LPT-TKN. A logical product circuit 317 outputs a logical product between the output value of the exclusive logical sum circuit 316 and the output value of the logical product circuit 311 as a prediction mismatch bit PRD-BY-LPT. The prediction mismatch bit PRD-BY-LPT becomes "1" when not the output value of the exclusive logical sum circuit 310 (the branch prediction information by the pattern history table 302) but the branch prediction information LPT-TKN by the local pattern table 303 is selected, and the output value of the exclusive logical sum circuit 310 (the branch prediction information by the pattern history table 302) and the branch prediction information LPT-TKN by the local pattern table 303 are different. When the failure of the branch prediction turns out after the branch instruction completion under a state in which the prediction mismatch bit PRD-BY-LPT is "1", a disabling process of the local pattern table 303 is performed as described later.

FIG. 8 is a flowchart illustrating a control method of the above-stated arithmetic processing device. At step S801, the branch prediction unit 22 checks whether or not the branch history table hit bit BRHIS-HIT is "1". When the branch history table hit bit BRHIS-HIT is "1", the process proceeds to step S802 because the fetched instruction is the branch instruction. When the branch history table hit bit BRHIS-HIT is "0" (zero), the process proceeds to step S821 because the fetched instruction is not the branch instruction.

At the step S821, the branch prediction unit 22 predicts that the fetched instruction is not the branch instruction. Next, at step S822, the branch prediction unit 22 predicts that the branch is not taken, and the branch prediction information PREDICT-TAKEN becomes "0" (zero). Next, at step S823, the selector 305 sets a value consecutive to an address which is instruction fetched at a previous time as the next instruction fetch address NEXT-FIAR[31:0].

At the step S802, the branch prediction unit 22 checks whether or not the conditional branch instruction bit P-COND-BIT is "1". When the conditional branch instruction bit P-COND-BIT is "1", the fetched instruction is the conditional branch instruction, and therefore, the process proceeds to step S803. When the conditional branch instruction bit P-COND-BIT is "0" (zero), the fetched instruction is the unconditional branch instruction, and therefore, the process proceeds to step S818.

At the step S818, the branch prediction unit 22 predicts that the fetched instruction is the unconditional branch instruction. Next, at step S819, the branch prediction unit 22 predicts that the branch is taken, and the branch prediction information PREDICT-TAKEN becomes "1". Next, at step S820, the selector 305 sets the branch target address PTIAR[31:0] registered to the branch history table (BRHIS) 301 as the next instruction fetch address NEXT-FIAR[31:0].

At the step S803, the branch prediction unit 22 checks whether or not the condition taken consecutive number of times accuracy bit THTC-PRD is "1" and the condition not-taken consecutive number of times accuracy bit THNC-PRD is "1". When both the condition taken consecutive number of times accuracy bit THTC-PRD and the condition not-taken consecutive number of times accuracy bit THNC-PRD are "1", the process proceeds to step S804 to perform the branch prediction by using the local pattern table (LPT) 303. When both the condition taken consecutive number of times accuracy bit THTC-PRD and the condition not-taken consecutive number of times accuracy bit THNC-PRD are not "1", the process proceeds to step S811 to perform the branch prediction by using the pattern history table (PHT) 302.

At the step S811, the branch prediction unit 22 checks whether or not the condition taken expected value BRHIS-EXPECT-BIT is "1". When the condition taken expected value BRHIS-EXPECT-BIT is "1", the process proceeds to step S812, and when the condition taken expected value BRHIS-EXPECT-BIT is "0" (zero), the process proceeds to step S815.

At the step S812, the branch prediction unit 22 checks whether or not the branch taken accuracy information BP1[1] is "1". When the branch taken accuracy information BP1[1] is "1", the process proceeds to step S813, and when the branch taken accuracy information BP1[1] is "0" (zero), the process proceeds to step S814. At the step S813, the branch prediction unit 22 predicts that the branch is not taken, the branch prediction information PREDICT-TAKEN becomes "0" (zero), and the process proceeds to step S823. At the step S814, the branch prediction unit 22 predicts that the branch is taken, the branch prediction information PREDICT-TAKEN becomes "1", and the process proceeds to step S820.

At the step S815, the branch prediction unit 22 checks whether or not the branch taken accuracy information BP1[1] is "1". When the branch taken accuracy information BP1[1] is "1", the process proceeds to step S816, and when the branch taken accuracy information BP1[1] is "0" (zero), the process proceeds to step S817. At the step S816, the branch prediction unit 22 predicts that the branch is taken, the branch prediction information PREDICT-TAKEN becomes "1", and the process proceeds to the step S820. At the step S817, the branch prediction unit 22 predicts that the branch is not taken, the branch prediction information PREDICT-TAKEN becomes "0" (zero), and the process proceeds to the step S823.

At the step S804, the branch prediction unit 22 checks whether or not the current prediction condition taken bit PRD-CNT-TKN is "1". When the current prediction condition taken bit PRD-CNT-TKN is "1", the process proceeds to step S805, and when the current prediction condition taken bit PRD-CNT-TKN is "0" (zero), the process proceeds to step S808.

At the step S805, the branch prediction unit 22 checks whether or not the current prediction consecutive number of times PRD-CNT[5:0] is smaller than the one cycle condition taken consecutive number of times THT-CNT[5:0]. When the current prediction consecutive number of times PRD-CNT[5:0] is smaller than the one cycle condition taken consecutive number of times THT-CNT[5:0], the process proceeds to step S806, and when the current prediction consecutive number of times PRD-CNT[5:0] is not smaller than the one cycle condition taken consecutive number of times THT-CNT[5:0], the process proceeds to step S807. At the step S806, the branch prediction unit 22 predicts that the branch is taken, the branch prediction information PREDICT-TAKEN becomes "1", and the process proceeds to the step S820. At the step S807, the branch prediction unit 22 predicts that the branch is not taken, the branch prediction information PREDICT-TAKEN becomes "0" (zero), and the process proceeds to the step S823.

At the step S808, the branch prediction unit 22 checks whether or not the current prediction consecutive number of times PRD-CNT[5:0] is the same as the one cycle condition not-taken consecutive number of times THN-CNT[5:0]. When the current prediction consecutive number of times PRD-CNT[5:0] is the same as the one cycle condition not-taken consecutive number of times THT-CNT[5:0], the process proceeds to step S809, and when the current prediction consecutive number of times PRD-CNT[5:0] is not the same as the one cycle condition not-taken consecutive number of times THN-CNT[5:0], the process proceeds to step S810. At the step S809, the branch prediction unit 22 predicts that the branch is taken, the branch prediction information PREDICT-TAKEN becomes "1", and the process proceeds to the step S820. At the step S810, the branch prediction unit 22 predicts that the branch is not taken, the branch prediction information PREDICT-TAKEN becomes "0" (zero), and the process proceeds to the step S823.

At the step S820, the selector 305 sets the branch target address PTIAR[31:0] registered at the branch history table (BTHIS) 301 as the next instruction fetch address NEXT-FIAR[31:0]. At the step S823, the selector 305 sets a value consecutive to the address which is instruction fetched at the previous time as the next instruction fetch address NEXT-FIAR[31:0].

Figure 9:
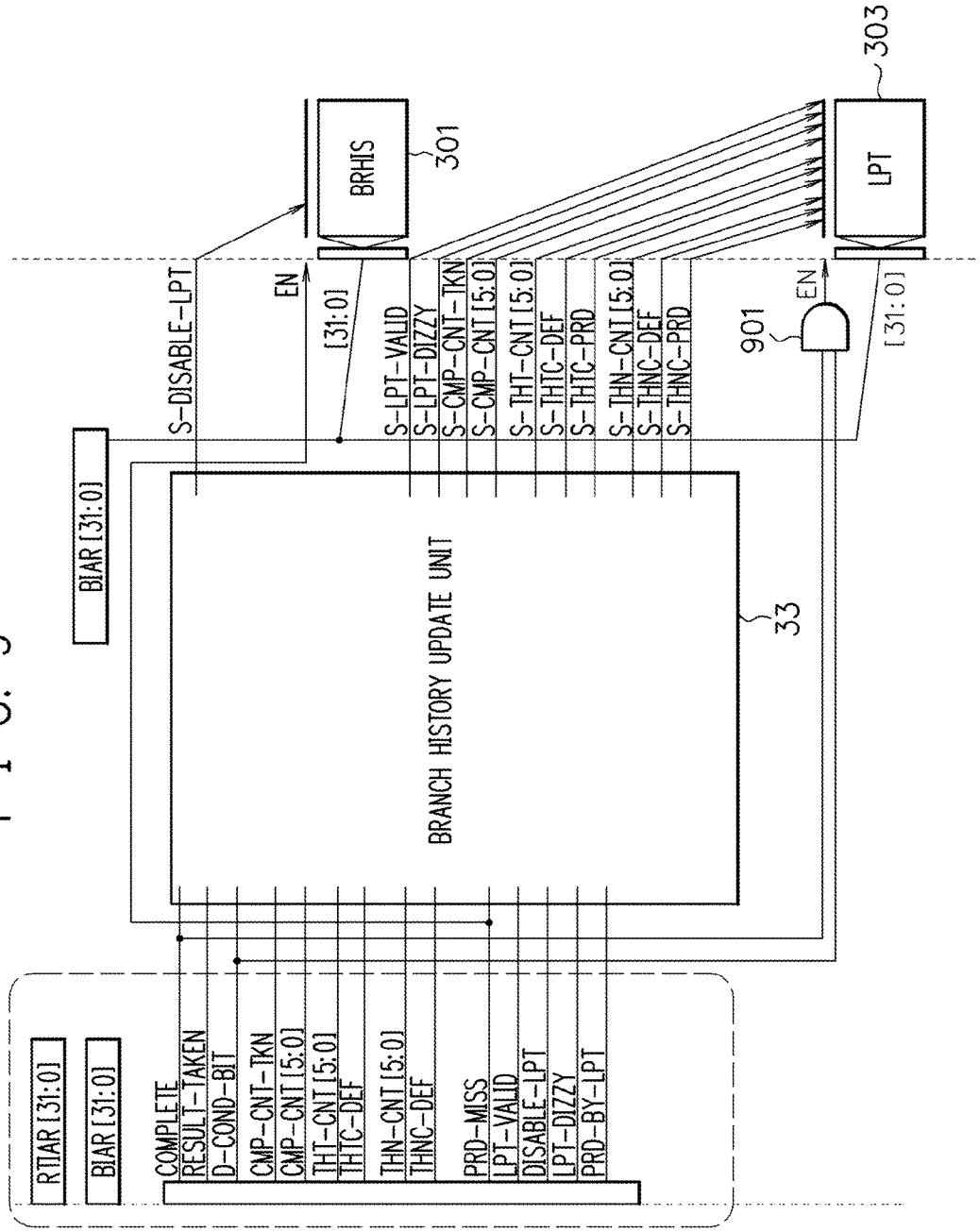
FIG. 9 is a view illustrating an input/output signal of a branch history update unit in FIG. 2.

FIG. 9 is a view illustrating an input/output signal of the branch history update unit 33 in FIG. 2. The branch history update unit 33 performs updates of the branch history table (BRHIS) 301, the pattern history table (PHT) 302, and the local pattern table (LPT) 303 based on the results of the branch operation by the branch control unit 30 in FIG. 2. The branch history update unit 33 inputs a determined branch target address RTIAR[31:0], a branch instruction address BIAR[31:0], a branch instruction completion bit COMPLETE, a branch taken determination bit RESULT-TAKEN, a conditional branch instruction determination bit D-COND-BIT, the above-stated current completion condition taken bit CMP-CNT-TKN, the above-stated current completion consecutive number of times CMP-CNT[5:0], the above-stated one cycle condition taken consecutive number of times THT-CNT[5:0], the above-stated condition taken change bit THTC-DEF, the above-stated one cycle condition not-taken consecutive number of times THN-CNT[5:0], the above-stated condition not-taken change bit THNC-DEF, a branch prediction mistaken bit PRD-MISS, the above-stated valid flag LPT-VALID, an LPT disable bit DISABLE-LPT, the above-stated prediction mistaken bit LPT-DIZZY, the above-stated prediction mismatch bit PRD-BY-LPT from the branch control unit 30 in FIG. 2. Note that the LPT disable bit DISABLE-LPT and the prediction mismatch bit PRD-BY-LPT are signals created at the branch prediction time, and propagating the pipeline.

The determined branch target address RTIAR[31:0] is a branch target address obtained by the arithmetic operation completion of the branch instruction. The branch instruction completion bit COMPLETE indicates the arithmetic operation completion of the branch instruction when it is "1", and indicates the arithmetic operation incompletion of the branch instruction when it is "0" (zero). The branch taken determination bit RESULT-TAKEN indicates the determination of the conditional branch taken when it is "1", and indicates the determination of the conditional branch not-taken when it is "0" (zero). The conditional branch instruction determination bit D-COND-BIT indicates that the fetched and decoded instruction is determined to be the conditional branch instruction when it is "1", and indicates that the fetched and decoded instruction is determined not to be the conditional branch instruction when it is "0" (zero). The branch prediction mistaken bit PRD-MISS indicates that the branch prediction by the branch prediction unit 22 is mistaken when it is "1", and indicates that the branch prediction by the branch prediction unit 22 is success when it is "0" (zero). The LPT disable bit DISABLE-LPT indicates that the local pattern table (LPT) 303 is disabled when it is "1", and indicates that the local pattern table (LPT) 303 is enabled when it is "0" (zero).

The branch instruction address BIAR[31:0] is input to the branch history table (BRHIS) 301 and the local pattern table (LPT) 303. The branch prediction mistaken bit PRD-MISS is input to the branch history table (BRHIS) 301 as an enable signal EN. A logical product circuit 901 outputs a logical product between the branch instruction completion bit COMPLETE and the conditional branch determination bit D-COND-BIT as the enable signal EN to the local pattern table (LPT) 303.

Figure 10:
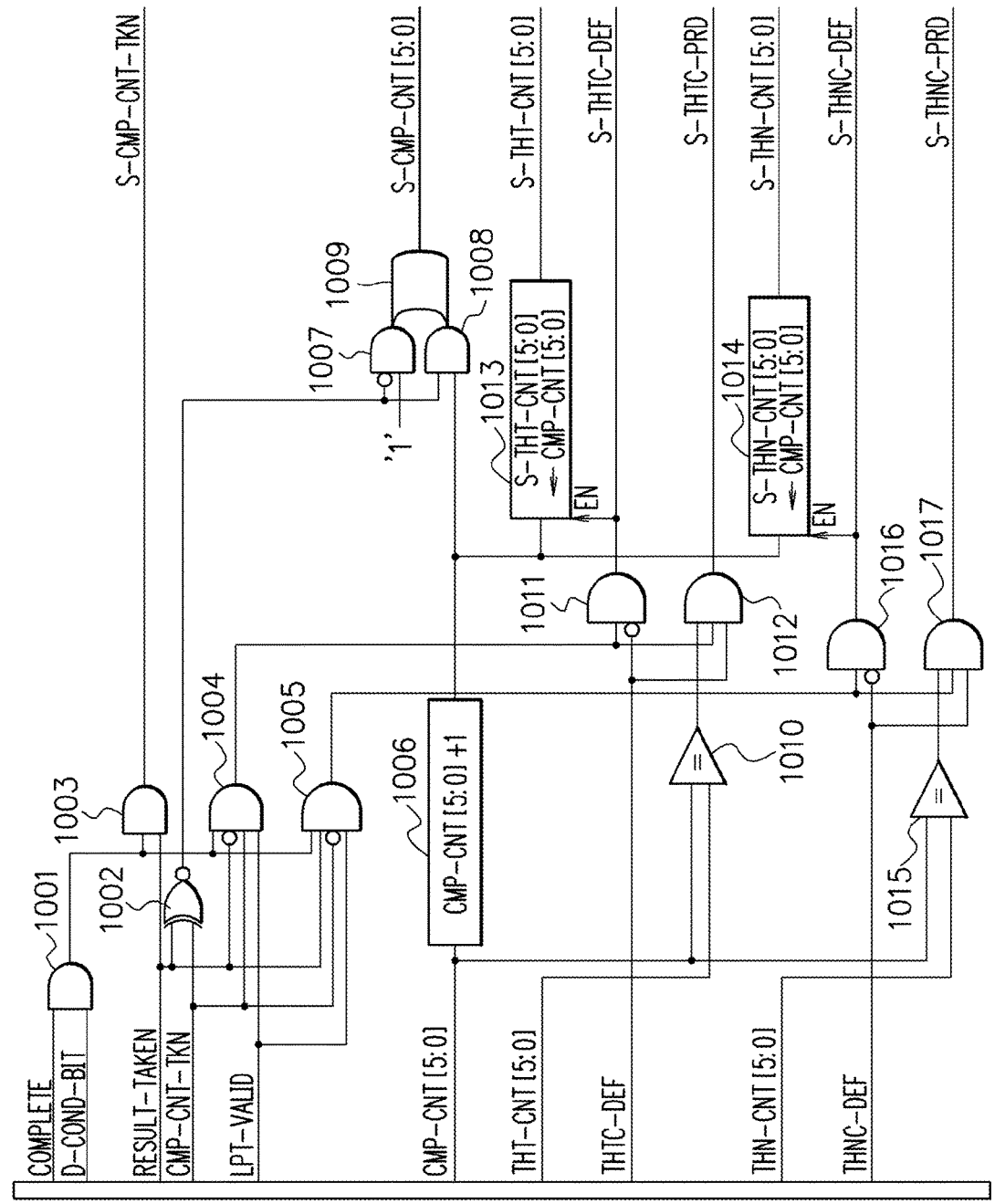
FIG. 10 is a view illustrating a configuration example of a part of the branch history update unit in FIG. 9.

FIG. 10 is a view illustrating a configuration example of a part of the branch history update unit 33 in FIG. 9. A logical product circuit 1001 outputs a logical product signal between the branch instruction completion bit COMPLETE and the conditional branch instruction determination bit D-COND-BIT. A logical product circuit 1003 outputs a logical product signal between the output signal of the logical product circuit 1001 and the branch taken determination bit RESULT-TAKEN as a current completion condition taken bit S-CMP-CNT-TKN to the local pattern table (LPT) 303. The current completion condition taken bit S-CMP-CNT-TKN corresponds to the current completion condition taken bit CMP-CNT-TKN in FIG. 4C.

An exclusive negative logical sum circuit 1002 outputs an exclusive negative logical sum signal between the branch taken determination bit RESULT-TAKEN and the current completion condition taken bit CMP-CNT-TKN. A logical product circuit 1004 outputs a logical product signal among the output signal of the logical product circuit 1001, a logically inverted signal of the branch taken determination bit RESULT-TAKEN, the current completion condition taken bit CMP-CNT-TKN, and the valid flag LPT-VALID. A logical product circuit 1005 outputs a logical product signal among the output signal of the logical product circuit 1001, the branch taken determination bit RESULT-TAKEN, a logically inverted signal of the current completion condition taken bit CMP-CNT-TKN, and the valid flag LPT-VALID. And an adder 1006 increments and outputs a value of the current completion consecutive number of times CMP-CNT[5:0].

A logical product circuit 1007 outputs a logical product signal between a logically inverted signal of the output signal of the exclusive negative logical sum circuit 1002 and "1". A logical product circuit 1008 outputs a logical product signal between the output signal of the exclusive negative logical sum circuit 1002 and the output signal of the adder 1006. A logical sum circuit 1009 outputs a logical sum signal between the output signals of the logical product circuits 1007 and 1008 as a current completion consecutive number of times S-CMP-CNT[5:0] to the local pattern table (LPT) 303. The current completion consecutive number of times S-CMP-CNT[5:0] corresponds to the current completion consecutive number of times CMP-CNT[5:0] in FIG. 4C.

A logical product circuit 1011 outputs a logical product signal between the output signal of the logical product circuit 1004 and a logically inverted signal of the condition taken change bit THTC-DEF as a condition taken change bit S-THTC-DEF to the local pattern table (LPT) 303. The condition taken change bit S-THTC-DEF corresponds to the condition taken change bit THTC-DEF in FIG. 4C.

A latch circuit 1013 makes the condition taken change bit S-THTC-DEF as the enable signal EN, latches the current completion consecutive number of times CMP-CNT[5:0] output from the adder 1006, and outputs as a one cycle condition taken consecutive number of times S-THT-CNT[5:0] to the local pattern table (LPT) 303. The one cycle condition taken consecutive number of times S-THT-CNT[5:0] corresponds to the one cycle condition taken consecutive number of times THT-CNT[5:0] in FIG. 4C.

A comparator 1010 outputs "1" when the current completion consecutive number of times CMP-CNT[5:0] and the one cycle condition taken consecutive number of times THT-CNT[5:0] are the same, and outputs "0" (zero) when they are different. A logical product circuit 1012 outputs a logical product signal among the output signal of the comparator 1010, the output signal of the logical product circuit 1004, and the condition taken change bit THTC-DEF as a condition taken consecutive number of times accuracy bit S-THTC-PRD to the local pattern table (LPT) 303. The condition taken consecutive number of times accuracy bit S-THTC-PRD corresponds to the condition taken consecutive number of accuracy bit THTC-PRD in FIG. 4C.

A logical product circuit 1016 outputs a logical product signal between the output signal of the logical product circuit 1005 and a logically inverted signal of the condition not-taken change bit THNC-DEF as a condition not-taken change bit S-THNC-DEF to the local pattern table (LPT) 303. The condition not-taken change bit S-THNC-DEF corresponds to the condition not-taken change bit THNC-DEF in FIG. 4C.

A latch circuit 1014 makes the condition not-taken change bit S-THNC-DEF as the enable signal EN, latches the current completion consecutive number of times CMP-CNT[5:0] output from the adder 1006, and outputs as a one cycle condition not-taken consecutive number of times S-THN-CNT[5:0] to the local pattern table (LPT) 303. The one cycle condition not-taken consecutive number of times S-THN-CNT[5:0] corresponds to the one cycle condition not-taken consecutive number of times THN-CNT[5:0] in FIG. 4C.

A comparator 1015 outputs "1" when the current completion consecutive number of times CMP-CNT[5:0] and the one cycle condition not-taken consecutive number of times THN-CNT[5:0] are the same, and outputs "0" (zero) when they are different. A logical product circuit 1017 outputs a logical product signal among the output signal of the comparator 1015, the output signal of the logical product circuit 1005, and the condition not-taken change bit THNC-DEF as a condition not-taken consecutive number of times accuracy bit S-THNC-PRD to the local pattern table (LPT) 303. The condition not-taken consecutive number of times accuracy bit S-THNC-PRD corresponds to the condition not-taken consecutive number of times accuracy bit THNC-PRD in FIG. 4C.

As stated above, the branch taken determination bit "RESULT-TAKEN=1" indicates that the conditional branch is taken, and the branch taken determination bit "RESULT-TAKEN=0" (zero)" indicates that the conditional branch is not taken. When "RESULT-TAKEN=1", the number of times in which the branch instruction hit to an entry is completed in the branch taken/not-taken is counted as the CMP-CNT[5:0], and "1" is set to the S-CMP-CNT-TKN. The S-CMP-CNT[5:0] is counted up by adding "1" to the CMP-CNT[5:0] when the branch does not change from not-taken to taken. When the branch changes from not-taken to taken, "1" is set to the S-CMP-CNT[5:0] to be initialized. When the THNC-DEF is "0" (zero), "1" is set to the S-THNC-DEF, and a value of the CMP-CNT[5:0] is set to the S-THN-CNT[5:0]. When the THNC-DEF is "1", the value of the CMP-CNT[5:0] and the THN-CNT[5:0] are compared, and when they are the same value, namely, when the values are continuously the same, it becomes a branch prediction enable state, and "1" is set to the S-THNC-PRD.

Similarly, when the "RESULT-TAKEN is "0" (zero)", "0" (zero) is set to the CMP-CNT-TKN. If the branch does not change from taken to not-taken, "1" is added to the CMP-CNT[5:0], and the CMP-CNT[5:0] is count up. When the branch changes from taken to not-taken, "1" is set to the CMP-CNT[5:0] to be initialized. When the THTC-DEF is "0" (zero), "1" is set to the S-THTC-DEF, and the value of the CMP-CNT[5:0] is set at the S-THT-CNT[5:0]. When the THTC-DEF is "1", the value of the CMP-CNT[5:0] and the THT-CNT[5:0] are compared, and when they are the same value, namely, when the values are continuously the same, it becomes the branch prediction enable state, and "1" is set to the S-THTC-PRD. When both the S-THTC-PRD and the S-THNC-PRD are "1", the branch prediction by the local pattern table (LPT) 303 is selected.

Figure 11:
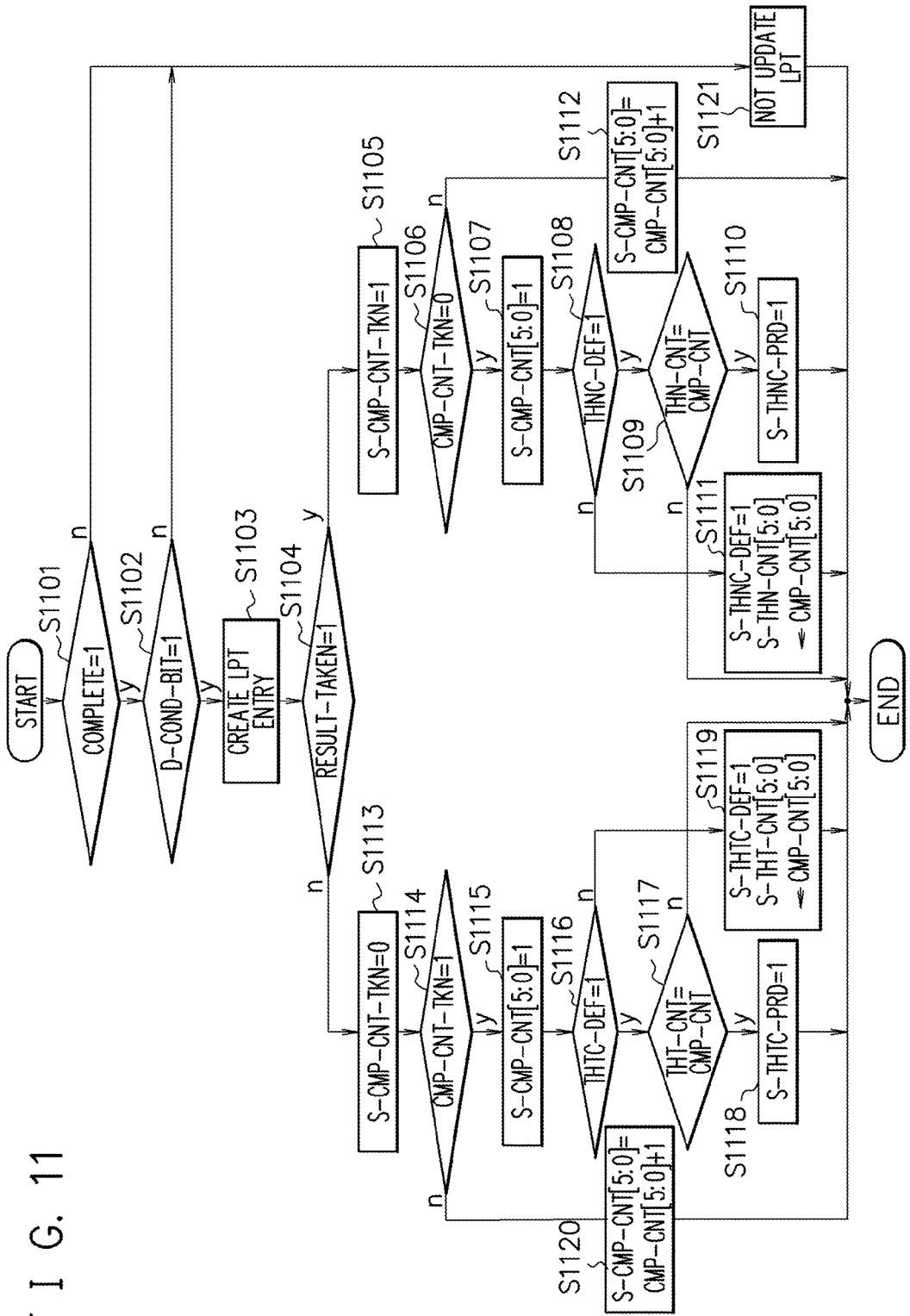
FIG. 11 is a flowchart illustrating a process of circuits in FIG. 10.

FIG. 11 is a flowchart illustrating processes of circuits in FIG. 10. At step S1101, the branch history update unit 33 checks whether or not the branch instruction completion bit COMPLETE is "1". When the branch instruction completion bit COMPLETE is "1", the branch operation is completed, and therefore, the process proceeds to step S1102. When the branch instruction completion bit COMPLETE is "0" (zero), the branch operation is not completed, and therefore, the process proceeds to step S1121. At the step S1121, the branch history update unit 33 does not update the local pattern table (LPT) 303.

At the step S1102, the branch history update unit 33 checks whether or not the conditional branch instruction determination bit D-COND-BIT is "1". When the conditional branch instruction determination bit D-COND-BIT is "1", it is indicated that a target instruction is the conditional branch instruction, and therefore, the process proceeds to step S1103. When the conditional branch instruction determination bit D-COND-BIT is "0" (zero), it is indicated that the target instruction is not the conditional branch instruction, and therefore, the process proceeds to the step S1121.

At the step S1103, the branch history update unit 33 creates entries of the local pattern table (LPT) 303. Details of this process are described later with reference to FIG. 13.

Next, at step S1104, the branch history update unit 33 checks whether or not the branch taken determination bit RESULT-TAKEN is "1". When the branch taken determination bit RESULT-TAKEN is "1", the conditional branch is taken, and therefore, the process proceeds to step S1105. When the branch taken determination bit RESULT-TAKEN is "0" (zero), the conditional branch is not taken, and therefore, the process proceeds to step S1113.

At the step S1105, the branch history update unit 33 sets "1" to the current completion condition taken bit S-CMP-CNT-TKN.

Next, at step S1106, the branch history update unit 33 checks whether or not the current completion condition taken bit CMP-CNT-TKN is "0" (zero). When the current completion condition taken bit CMP-CNT-TKN is "0" (zero), it means that the conditional branch changes from not-taken to taken, and therefore, the process proceeds to step S1107. When the current completion condition taken bit CMP-CNT-TKN is "1", it means that the conditional branch does not change from not-taken to taken, and therefore, the process proceeds to step S1112. At the step S1112, the branch history update unit 33 sets the current completion consecutive number of times CMP-CNT[5:0]+1 to the current completion consecutive number of times S-CMP-CNT[5:0].

At the step S1107, the branch history update unit 33 sets "1" to the current completion consecutive number of times S-CMP-CNT[5:0].

Next, at step S1108, the branch history update unit 33 checks whether or not the condition not-taken change bit THNC-DEF is "1". When the condition not-taken change bit THNC-DEF is "1", it means that the conditional branch changes from not-taken to taken, and therefore, the process proceeds to step 1109. When the condition not-taken change bit THNC-DEF is "0" (zero), it means that the conditional branch does not change from not-taken to taken, and therefore, the process proceeds to step S1111.

At the step S1111, the branch history update unit 33 sets "1" to the condition not-taken change bit S-THNC-DEF, and sets the current completion consecutive number of times CMP-CNT[5:0] to the one cycle condition not-taken consecutive number of times S-THN-CNT[5:0].

At the step S1109, the branch history update unit 33 checks whether or not the current completion consecutive number of times CMP-CNT[5:0] and the one cycle condition not-taken consecutive number of times THN-CNT[5:0] are the same. When both are the same, the process proceeds to step S1110, and when both are different, the process is finished. At the step S1110, the branch history update unit 33 sets "1" to the condition not-taken consecutive number of times accuracy bit S-THNC-PRD.

At the step S1113, the branch history update unit 33 sets "0" (zero) to the current completion condition taken bit S-CMP-CNT-TKN.

Next, at step S1114, the branch history update unit 33 checks whether or not the current completion condition taken bit CMP-CNT-TKN is "1". When the current completion condition taken bit CMP-CNT-TKN is "1", it means that the conditional branch changes from taken to not-taken, and therefore, the process proceeds to step S1115. When the current completion condition taken bit CMP-CNT-TKN is "0" (zero), it means that the conditional branch does not change from taken to not-taken, and therefore, the process proceeds to step S1120. At the step S1120, the branch history update unit 33 sets the current completion consecutive number of times CMP-CNT[5:0]+1 to the current completion consecutive number of times S-CMP-CNT[5:0].

At the step S1115, the branch history update unit 33 sets "1" to the current completion consecutive number of times S-CMP-CNT[5:0].

Next, at step S1116, the branch history update unit 33 checks whether or not the condition taken change bit THTC-DEF is "1". When the condition taken change bit THTC-DEF is "1", it means that the conditional branch changes from taken to not-taken, and therefore, the process proceeds to step S1117. When the condition taken change bit THTC-DEF is "0" (zero), it means that the conditional branch does not change from taken to not-taken, and therefore, the process proceeds to step S1119.

At the step S1119, the branch history update unit 33 sets "1" to the condition taken change bit S-THTC-DEF, and sets the current completion consecutive number of times CMP-CNT[5:0] to the one cycle condition taken consecutive number of times S-THT-CNT[5:0].

At the step S1117, the branch history update unit 33 checks whether or not the current completion consecutive number of times CMP-CNT[5:0] and the one cycle condition taken consecutive number of times THT-CNT[5:0] are the same. When both are the same, the process proceeds to step S1118, and when both are different, the process is finished. At the step S1118, the branch history update unit 33 sets "1" to the condition taken consecutive number of times accuracy bit S-THTC-PRD.

Figure 12:
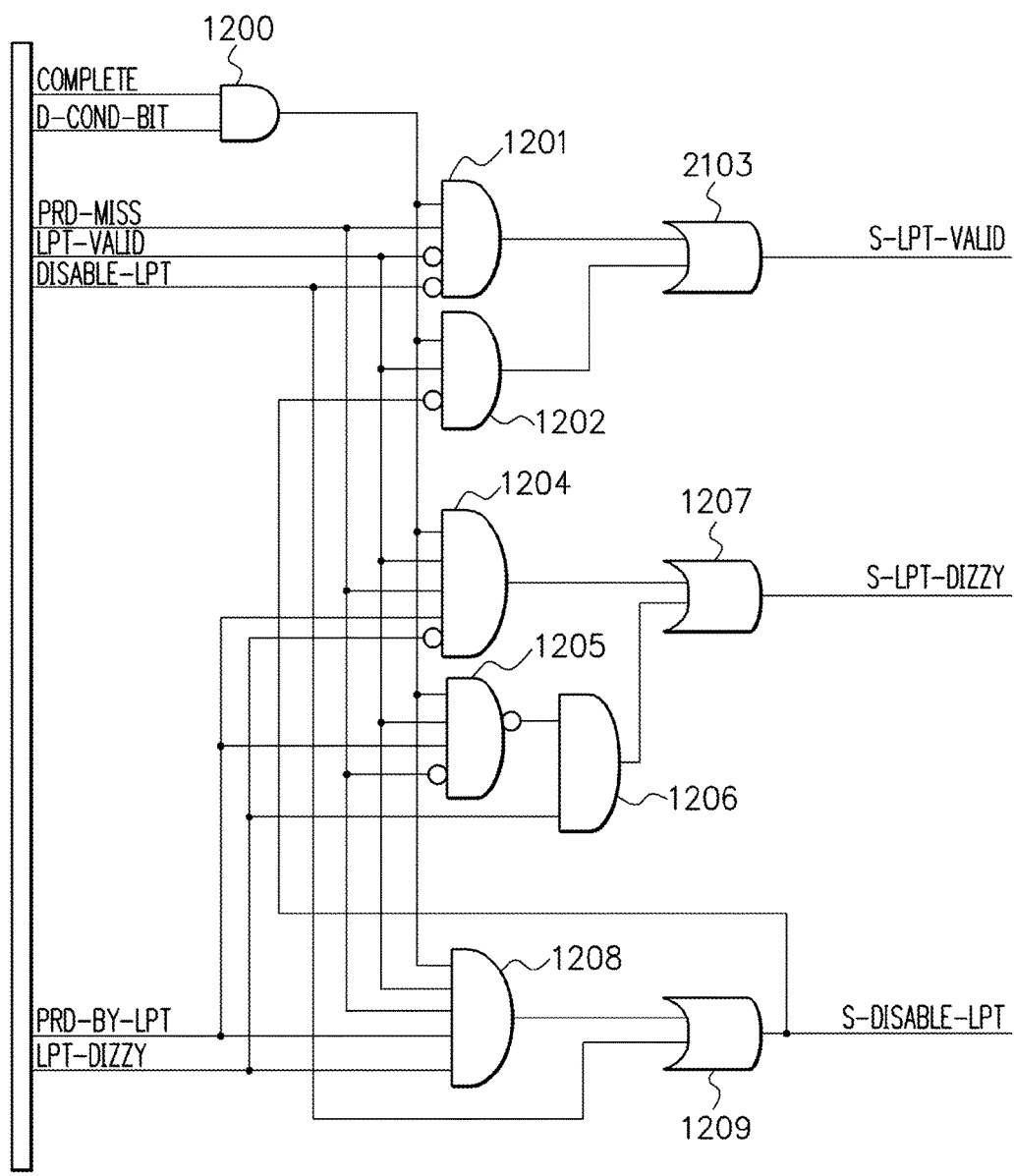
FIG. 12 is a view illustrating a configuration example of a part of the branch history update unit in FIG. 9.

FIG. 12 is a view illustrating a configuration example of a part of the branch history update unit 33 in FIG. 9. A logical product circuit 1200 outputs a logical product signal between the branch instruction completion bit COMPLETE and the conditional branch instruction determination bit D-COND-BIT. A logical product circuit 1201 outputs a logical product signal among the output signal of the logical product circuit 1200, the branch prediction mistaken bit PRD-MISS, a logically inverted bit of the valid flag LPT-VALID, and a logically inverted bit of the LPT disable bit DISABLE-LPT. A logical product circuit 1202 outputs a logical product signal among the output signal of the logical product circuit 1200, the valid flag LPT-VALID, and a logically inverted bit of an LPT disable bit S-DISABLE-LPT. A logical sum circuit 1203 outputs a logical sum signal between the output signals of the logical product circuits 1201 and 1202 as a valid flag S-LPT-VALID to the local pattern table (LPT) 303. The valid flag S-LPT-VALID corresponds to the valid flag LPT-VALID in FIG. 4C.

A logical product circuit 1204 outputs a logical product signal among the output signal of the logical product circuit 1200, the valid flag LPT-VALID, the branch prediction mistaken bit PRD-MISS, the prediction mismatch bit PRD-BY-LPT, and a logically inverted bit of the prediction mistaken bit LPT-DIZZY. A negative logical product (NAND) circuit 1205 outputs a negative logical product signal among the output signal of the logical product circuit 1200, the valid flag LPT-VALID, the prediction mismatch bit PRD-BY-LPT, and a logically inverted bit of the branch prediction mistaken bit PRD-MISS. A logical product circuit 1206 outputs a logical product signal between the output signal of the negative logical product circuit 1205 and the prediction mistaken bit LPT-DIZZY. A logical sum circuit 1207 outputs a logical sum signal between the output signals of the logical product circuits 1204 and 1206 as a prediction mistaken bit S-LPT-DIZZY to the local pattern table (LPT) 303. The prediction mistaken bit S-LPT-DIZZY corresponds to the prediction mistaken bit LPT-DIZZY in FIG. 4C.

A logical product circuit 1208 outputs a logical product signal among the output signal of the logical product circuit 1200, the valid flag LPT-VALID, the branch prediction mistaken bit PRD-MISS, the prediction mismatch bit PRD-BY-LPT, and the prediction mistaken bit LPT-DIZZY. A logical sum circuit 1209 outputs a logical sum signal between the output signal of the logical product circuit 1208 and the LPT disable bit DISABLE-LPT as an LPT disable bit S-DISABLE-LPT to the branch history table (BRHIS) 301. The LPT disable bit S-DISABLE-LPT corresponds to the LPT disable bit DISABLE-LPT.

As stated above, the local pattern table (LPT) 303 sets "1" to the valid flag S-LPT-VALID when the branch instruction completion bit COMPLETE is "1" and the conditional branch instruction determination bit D-COND-BIT is "1", and when the valid flag LPT-VALID is "0" (zero), the LPT disable bit DISABLE-LPT is "0" (zero), and the branch prediction mistaken bit PRD-MISS is "1" (the branch prediction failure). The entries of the local pattern table (LPT) 303 thereby become valid.

Figure 13:
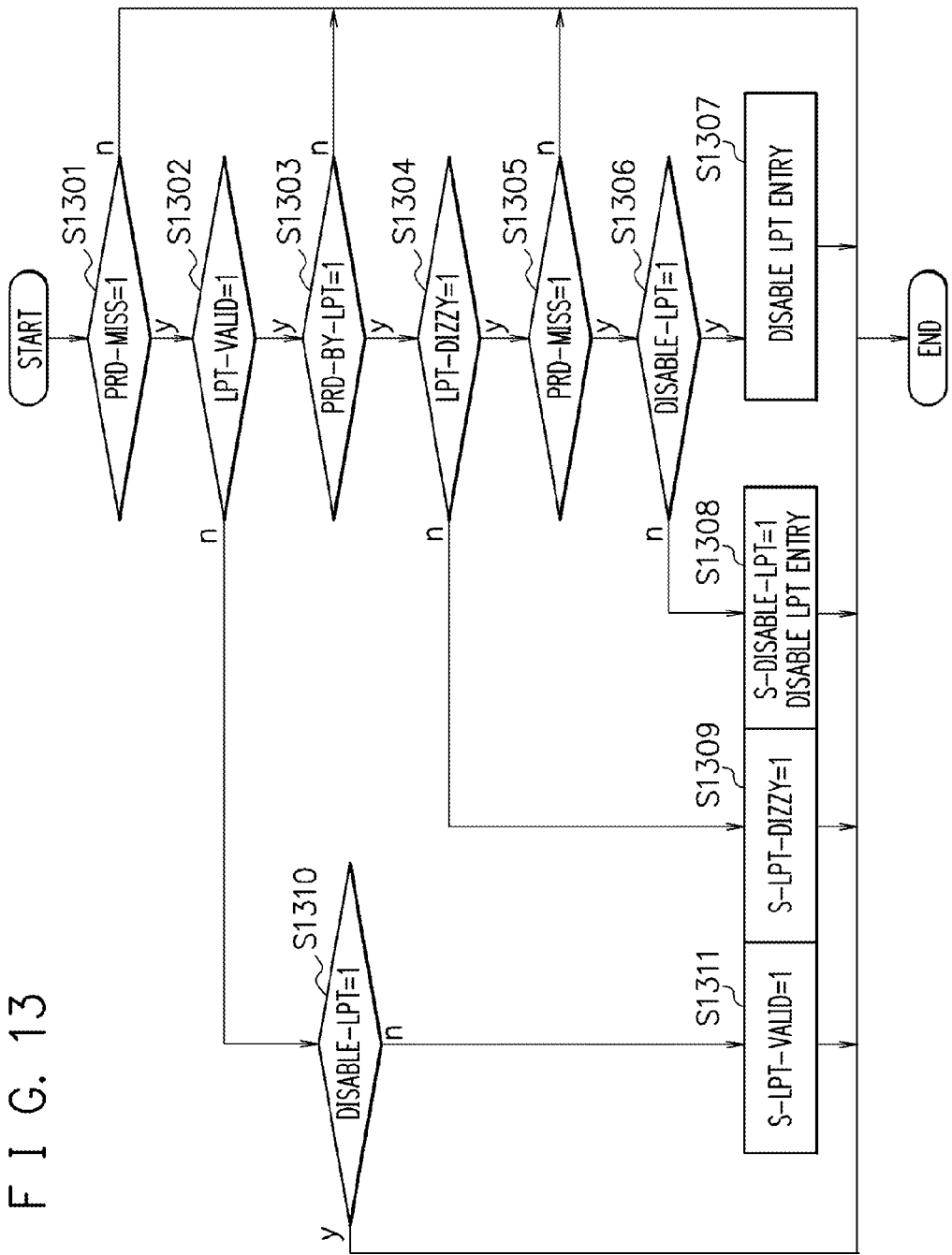
FIG. 13 is a flowchart illustrating a process of circuits in FIG. 12.

FIG. 13 is a flowchart illustrating a process of circuits in FIG. 12. At step S1301, the branch history update unit 33 checks whether or not the branch prediction mistaken bit PRD-MISS is "1". When the branch prediction mistaken bit PRD-MISS is "1", it means failure of the branch prediction, and therefore, the process proceeds to step S1302. When the branch prediction mistaken bit PRD-MISS is "0" (zero), it means success of the branch prediction, and therefore, the process is finished.

At the step S1302, the branch history update unit 33 checks whether or not the valid flag LPT-VALID is "1". When the valid flag LPT-VALID is "1", the entries of the local pattern table (LPT) 303 are valid, and therefore, the process proceeds to step S1303. When the valid flag LPT-VALID is "0" (zero), the entries of the local pattern table (LPT) 303 are disabled, and therefore, the process proceeds to step S1310.

At the step S1303, the branch history update unit 33 checks whether or not the prediction mismatch bit PRD-BY-LPT is "1". When the prediction mismatch bit PRD-BY-LPT is "1", it means that the prediction result by the pattern history table (PHT) 302 and the prediction result by the local pattern table (LPT) 303 are different, and therefore, the process proceeds to step S1304. When the prediction mismatch bit PRD-BY-LPT is "0" (zero), it means that the prediction result by the pattern history table (PHT) 302 and the prediction result by the local pattern table (LPT) 303 are the same, and therefore, the process is finished.

At the step S1304, the branch history update unit 33 checks whether or not the prediction mistaken bit LPT-DIZZY is "1". When the prediction mistaken bit LPT-DIZZY is "1", it means that the branch prediction by the local pattern table 303 performed at a previous time fails, and therefore, the process proceeds to step S1305. When the prediction mistaken bit LPT-DIZZY is "0" (zero), the process proceeds to step S1309.

At the step S1305, the branch history update unit 33 checks whether or not the branch prediction mistaken bit PRD-MISS is "1". When the branch prediction mistaken bit PRD-MISS is "1", it means the failure of the branch prediction, and therefore, the process proceeds to step S1306. When the branch prediction mistaken bit PRD-MISS is "0" (zero), it means the success of the branch prediction, and therefore, the process is finished.

At the step S1306, the branch history update unit 33 checks whether or not the LPT disable bit DISABLE-LPT is "1". When the LPT disable bit DISABLE-LPT is "1", it means that the local pattern table (LPT) 303 is disabled, and therefore, the process proceeds to step S1307. When the LPT disable bit DISABLE-LPT is "0" (zero), it means that the local pattern table (LPT) 303 is valid, and therefore, the process proceeds to step S1308.

At the step S1307, the branch history update unit 33 disables the entries of the local pattern table (LPT) 303.

At the step S1308, the branch history update unit 33 sets "1" to the LPT disable bit S-DISABLE-LPT, and disables the entries of the local pattern table (LPT) 303.

At the step S1309, the branch history update unit 33 sets "1" to the prediction mistaken bit S-LPT-DIZZY.

At the step S1310, the branch history update unit 33 checks whether or not the LPT disable bit DISABLE-LPT is "1". When the LPT disable bit DISABLE-LPT is "1", it means that the local pattern table (LPT) 303 is disabled, and therefore, the process is finished. When the LPT disable bit DISABLE-LPT is "0" (zero), it means that the local pattern table (LPT) 303 is valid, and therefore, the process proceeds to step S1311.

At the step S1311, the branch history update unit 33 sets "1" to the valid flag S-LPT-VALID.

As stated above, if the branch prediction of the branch instructions whose consecutive number of times of taken/not-taken of the conditional branch is not stable is performed by the local pattern table (LPT) 303, there is a possibility in which branch prediction performance is lowered. To avoid the risk as stated above, the branch prediction by the pattern history table (PHT) 302 is performed for the branch instruction which does not suit for the local pattern table (LPT) 303 by disabling the branch prediction by the local pattern table (LPT) 303.

It is constituted as stated above, and thereby, the branch prediction by the local pattern table (LPT) 303 is performed during a period until a registration process of the pattern history table (PHT) 302 is finished because the branch prediction by the pattern history table (PHT) 302 cannot be performed. It is thereby possible to improve accuracy of the branch prediction. The local pattern table (LPT) 303 performs the branch prediction based on the consecutive number of times of taken/not-taken of the conditional branch, and therefore, it is possible to complete the registration in early stage and to perform the branch prediction in early stage compared to the pattern history table (PHT) 302.

A first prediction unit 310 including the pattern history table (PHT) 302 outputs branch prediction information of the fetched conditional branch instruction based on a past branch history pattern of the conditional branch instructions. A second prediction unit 312 including the local pattern table (LPT) 303 stores the branch taken consecutive number of times and the branch not-taken consecutive number of times of the conditional branch instruction, and outputs the branch prediction information LPT-TKN of the fetched conditional branch instruction based on the branch taken consecutive number of times or the branch not-taken consecutive number of times in the past.

Selecting units 311, 313 to 315 selectively output the branch prediction information output from the first prediction unit 310 or the branch prediction information LPT-TKN output from the second prediction unit 312. The selector 305 outputs a next address or the branch target address PTIAR [31:0] to the instruction fetch unit 21 in accordance with the branch prediction information output by the selecting units 311, 313 to 315.

The selecting unit 311 outputs the branch prediction information LPT-TKN output from the second prediction unit 312 when a cycle of the branch taken consecutive number of times and the branch not-taken consecutive number of times appear for two cycles or more in the past, and outputs the branch prediction information output from the first prediction unit 310 when the cycle of the branch taken consecutive number of times and the branch not-taken consecutive number of times do not appear for two cycles or more in the past.

At the step S1301 in FIG. 13, the selecting units 311, 313 to 315 disable the prediction information output from the second prediction unit 312 when the branch prediction information LPT-TKN output from the second prediction unit 312 is output and the prediction by the branch prediction information LPT-TKN output from the second prediction unit 312 fails.

Besides, at the steps S1301 and S1303 in FIG. 13, the selecting units 311, 313 to 315 disable the branch prediction information LPT-TKN output from the second prediction unit 312 when the branch prediction information LPT-TKN output from the second prediction unit 312 is output, the branch prediction information output from the first prediction unit 310 and the branch prediction information LPT-TKN output from the second prediction unit 312 are different, and the prediction by the branch prediction information LPT-TKN output from the second prediction unit 312 fails.

Incidentally, the above-described embodiments are to be considered in all respects as illustrative and no restrictive. Namely, the present invention may be embodied in other specific forms without departing from the spirit or essential characteristics thereof.

The first prediction units and the second prediction unit are provided, and thereby, it is possible to improve accuracy of the branch prediction of the conditional branch instruction.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device, comprising:
a branch history storage unit configured to store past branch history information of conditional branch instructions;
first prediction units configured to output branch prediction information of a fetched conditional branch instruction based on the branch history information stored by the branch history storage unit;
a second prediction unit configured to store a branch taken consecutive number of times, being a number of times in which branches of the conditional branch instructions are consecutively taken, and a branch not-taken consecutive number of times, being a number of times in which the branches of the conditional branch instructions are consecutively not taken, to a pattern information storage unit, and output branch prediction information of the fetched conditional branch instruction based on the branch taken consecutive number of times or branch not-taken consecutive number of times in the past stored at the pattern information storage unit;
selecting units configured to output the branch prediction information output from the second prediction unit when a pattern having the branch taken consecutive number of times and the branch not-taken consecutive number of times appears twice or more in the past in the branch history information, and output the branch prediction information output from the first prediction units when a pattern having the branch taken consecutive number of times and the branch not-taken consecutive number of times appears once or less in the past; and
a selector configured to output a next instruction address of the conditional branch instruction or a branch target address of the conditional branch instruction to an instruction fetch unit in accordance with the branch prediction information output from the selecting units.

2. The arithmetic processing device according to claim 1, wherein the selecting units disable the prediction information output from the second prediction unit when the branch prediction information output from the second prediction unit is output, and a prediction by the branch prediction information output from the second prediction unit fails.

3. The arithmetic processing device according to claim 1, wherein the selecting units disable the branch prediction information output from the second prediction unit when the branch prediction information output from the second prediction unit is output, when the branch prediction information output from the first prediction unit and the branch prediction information output from the second prediction unit are different, and a prediction by the branch prediction information output from the second prediction unit fails.

4. A control method of an arithmetic processing device having a branch history storage unit storing past branch history information of conditional branch instructions, comprising:

outputting branch prediction information of a fetched conditional branch instruction by a first prediction unit held by the arithmetic processing device, based on the branch history information stored by the branch history storage unit;

storing a branch taken consecutive number of times, being a number of times in which branches of conditional branch instructions are consecutively taken, and a branch not-taken consecutive number of times, being a number of times in which the branches of the conditional branch instructions are consecutively not taken, to a pattern information storage unit by a second prediction unit held by the arithmetic processing device;

outputting branch prediction information of a fetched conditional branch instruction based on the branch taken consecutive number of times or branch not-taken consecutive number of times in the past stored at the pattern information storage unit by the second prediction unit;

outputting the branch prediction information output from the second prediction unit when a pattern having the branch taken consecutive number of times and the branch not-taken consecutive number of times appears twice or more in the past in the branch history information, and outputting the branch prediction information output from the first prediction unit when a pattern having the branch taken consecutive number of times and the branch not-taken consecutive number of times appears once or less in the past by selecting units held by the arithmetic processing device; and outputting a next instruction address of the conditional branch instruction or a branch target address of the conditional branch instruction to an instruction fetch unit in accordance with the branch prediction information output by the selecting units by a selector held by the arithmetic processing device.

* * * * *